United States Patent
Harper

(10) Patent No.: US 8,122,840 B2
(45) Date of Patent: Feb. 28, 2012

(54) TRANSOM STERN HULL FORM AND APPENDAGES FOR IMPROVED HYDRODYNAMICS

(76) Inventor: Justin A. Harper, St. Paul, MN (US)

( * ) Notice: Subject to any disclaimer, the term of this patent is extended or adjusted under 35 U.S.C. 154(b) by 794 days.

(21) Appl. No.: 12/166,864

(22) Filed: Jul. 2, 2008

(65) Prior Publication Data

US 2010/0000455 A1 Jan. 7, 2010

(51) Int. Cl.
B63B 1/24 (2006.01)
(52) U.S. Cl. .................... 114/61.32; 114/61.29
(58) Field of Classification Search ...... 114/61.29–61.3, 114/67 A, 288, 142, 162, 163, 145 R, 61.26
See application file for complete search history.

(56) References Cited

U.S. PATENT DOCUMENTS

| 5,388 | A | 12/1847 | Tuers |
|---|---|---|---|
| 7,449 | A | 6/1850 | Andrews |
| 332,212 | A | 12/1885 | Rider |
| 1,220,558 | A | 3/1917 | Richardson |
| 1,505,113 | A | 8/1924 | Warnock |
| 2,185,430 | A | 1/1940 | Burgess |
| 2,185,431 | A | 1/1940 | Burgess |
| 2,342,707 | A | 2/1944 | Troyer |
| 2,677,139 | A | 5/1954 | Canazzi |
| 2,919,669 | A | 1/1960 | Kikuhara |
| 2,974,624 | A | 3/1961 | Lewis |
| 3,045,629 | A | 7/1962 | Farrington |
| 3,046,926 | A | 7/1962 | Miller |
| 3,137,261 | A | 6/1964 | Noe |
| 3,930,455 | A | 1/1976 | Bremer |
| 3,991,696 | A | 11/1976 | Aoki |
| 4,079,688 | A | 3/1978 | Diry |
| 4,159,691 | A | 7/1979 | Paxton |
| 4,742,793 | A | 5/1988 | Mader et al. |
| 4,915,048 | A | 4/1990 | Stanford |
| 5,231,949 | A | 8/1993 | Hadley |
| 5,237,953 | A | 8/1993 | Mannerfelt |
| 5,415,122 | A | 5/1995 | Shen |
| 5,425,325 | A | 6/1995 | Washio |
| 5,474,008 | A | 12/1995 | Vespoli et al. |
| 5,535,690 | A | 7/1996 | Bystedt et al. |

(Continued)

FOREIGN PATENT DOCUMENTS

EP    1211171    6/2002

(Continued)

OTHER PUBLICATIONS

Baker, Elwyn S, "Review of Supercavitating Hydrofoil Experiments 1955 through 1972", *DTRC Rpt. SPD-567-01*, (Jun. 1975), 91 pgs.

(Continued)

*Primary Examiner* — Edwin Swinehart

(57) ABSTRACT

An improved displacement hull form for ships and boats, in one of many possible embodiments includes a transom stern hull form (100F) having a hull underside (120A) that is substantially horizontal in transverse orientation along the aftmost portion of said hull form (100F), a pair of endplates (300D) having a substantially vertical orientation along the aft half of said hull form (100F) waterline length, a pair of cambered rudders (502J) located near the stern of said hull form (100F) with said cambered rudders (502J) having pressure faces oriented towards said hull form longitudinal centerplane (110A), and stern buttock-line shaping defined by a supercavitating hydrofoil (700M) shape. The hydrodynamics of said hull form (100F) are improved in terms of reduced resistance, reduced trim and draft aft, and reduced ship wave train. Other embodiments are described and shown.

21 Claims, 16 Drawing Sheets

U.S. PATENT DOCUMENTS

| | | | |
|---|---|---|---|
| 5,570,650 | A | 11/1996 | Harley |
| 5,784,977 | A | 7/1998 | Schell et al. |
| 5,983,823 | A | 11/1999 | Allison |
| 5,988,087 | A | 11/1999 | Pepper |
| 6,038,995 | A | 3/2000 | Karafiath et al. |
| 6,085,677 | A | 7/2000 | Bell |
| 6,112,687 | A | 9/2000 | Eder |
| 6,158,369 | A | 12/2000 | Calderon |
| 6,216,622 | B1 | 4/2001 | Lindstrom |
| 6,698,370 | B1 | 3/2004 | Cusanelli |
| 6,805,067 | B1 | 10/2004 | Cusanelli |
| 6,834,605 | B1 | 12/2004 | Franke |
| 6,843,193 | B1 | 1/2005 | Alvarez-Calderon |
| 6,957,619 | B2 | 10/2005 | Reynolds |
| 7,131,385 | B1 * | 11/2006 | Ehlers et al. ............. 114/145 R |
| 2003/0226491 | A1 | 12/2003 | Waits, Jr. |
| 2005/0087120 | A1 | 4/2005 | Kalil |

FOREIGN PATENT DOCUMENTS

| | | | |
|---|---|---|---|
| JP | 02151595 A | * | 6/1990 |
| JP | 2001-219892 | | 8/2001 |
| RU | 2053914 | | 2/1996 |

OTHER PUBLICATIONS

Bertram, Volker, et al., "", *Ship Design for Efficiency and Economy*, Butterworth-Heinemann, Second Edition, (1998), 54-55.

Carlton, J S, "Thrust Augmentation Devices", *Chapter 13 of Marine Propellers & Propulsion*, 1995, 299-310.

Clement, Eugene P., "The Design of Cambered Planing Surfaces for Small Motorboats", *NRSDC Rpt. 3011*, (Mar. 1969), 8 pgs.

Cusanelli, D. S, et al., "Stern Flap Powering Performance on a Spruance Class Destroyer: Ship Trials and Model Experiments", *ASNE Naval Engineers Journal*, 111(2), (Mar. 1999), 69-81.

Eggert, E. F, "Further Form Resistance Experiments", *Trans. SNAME*, vol. 47, (1939), 303-330.

Fung, Siu, "Resistance and powering prediction for transom stern hull forms during early stage ship design", *Trans. SNAME*, vol. 99, 1991, 38 pgs.

Fung, Siu C, et al., "Revised speed-dependent powering predictions for high-speed transom stern hull forms", *FAST 1998*, Germany, (1998), 14 pgs.

Fung, Siu C., et al., "The effects of bulbous bows, stern flaps and a wave-piercing bow on the resistance of a series 64 hull form", *FAST2005 international conference* (St. Petersburg, Jun. 27-30, 2005).

Gillmer, Thomas Charles, "Tank Tests of Several Transom-Stern Configurations on Destroyer Escort Type Hulls", [Annapolis, Md.]: *United States Naval Academy, Engineering Laboratories*, (1961), 29 pgs.

Gurnee, L. T, et al., "An investigation of the effects of transom stern parameters on bare hull resistance for destroyer type ships", *M.S. Thesis, Webb Inst. of Naval Arch.*, (Jun. 14, 1968), 91 pgs.

Harries, Stefan, et al., "Formal hydrodynamic optimization of a fast monohull on the basis of parametric design", *5th International Conference. on Fast Sea Transportation—FAST '99*, (1999), 12 pgs.

Iwasaki, Yasunori, et al., "Studies on relationship between water surface behind stern and stern end form of fine ships", *Journal of the Society of Naval Architects of Japan*, vol. 180, (Dec. 1996), 13-20.

Johnson, Virgil, "Theoretical and Experimental Investigation of Supercavitating Hydrofoils Operating Near the Free Water Surface", *NASA TR R-93*, (1961), 81 pgs.

Karafaith, Gabor, et al., "Stern Wedges and Stern Flaps for Improved Powering—U.S. Navy Experience", *The Society of Naval Architects and Marine Engineers*, (1999), 27 pgs.

Kuethe, et al., "6.10: Winglets and 6.11 Other Characteristics of a Finite Wing", *Chapter 6 of Foundations of Aerodynamics, 5th ed., John Wiley and Sons, Inc.,*, (1998), 200-203.

McCormick, "Drag Reduction", *Chapter 4 of Aerodynamics, Aeronautics and Flight Mechanics, John Wiley and Sons, Inc.*, (1979), 214-221.

Pien, Pao C, et al., "A hull form design procedure for high speed displacement ships", *SNAME, Diamond Jubilee International Meeting*, (1968), 13-1 to 13-27.

Raymer, Daniel P., "Aircraft Design: A Conceptual Approach", *AIAA Education Series*, (1989), 62-65.

Shuford, Charles, "A theoretical and experimental study of planing surfaces including effects of cross section and plan form", *NACA Rpt. 1355*, (1957), 46 pgs.

Taylor, David Watson, "", *The Speed and Power of Ships: A Manual of Marine Propulsion*, United States Government Printing Office, (1943), 297 pgs.

Tulin, M. P, et al., "Linearized Theory for Flows about Lifting Foils at Zero Cavitation Number", *DTMB Rpt. C-638,*, (Feb. 1955), 31 pgs.

Van Manen, J. D., et al., "Resistance", *Chapter 5 of Principles of Naval Architecture: vol. II* (ed. Edward V. Lewis), (1988), 1-126.

Whitcomb, Richard T., "A Design Approach and Selected Wind-Tunnel Results and High Subsonic Speeds for Wing-Tip Mounted Winglets", *NASA Technical Note D-8260*, (Jul. 1976), 18 pgs.

* cited by examiner

TRANSOM STERN HULL FORM AND APPENDAGES FOR IMPROVED HYDRODYNAMICS

TECHNICAL FIELD

This application relates generally to the hydrodynamics of displacement hull marine vessels and more particularly to hull forms, adjuncts, appendages and auxiliary devices.

COPYRIGHT NOTICE

A portion of the disclosure of this patent contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Operators of marine vehicles desire that they traverse water efficiently. Efficient designs can decrease fuel consumption and increase performance.

SUMMARY

Various embodiments include a combination for affecting the hydrodynamics of a vessel including a transom stern hull form including a hull underside that is substantially horizontal in transverse orientation along the aft-most portion of said vessel, a pair of endplates having a substantially vertical orientation, and a means for joining said endplates at a substantially vertical orientation to said hull underside along the aft half of said vessel waterline length.

In one additional embodiment, the present subject matter includes a combination for affecting the hydrodynamics of a vessel, comprising a transom stern hull form having a hull underside that is substantially horizontal in transverse orientation along the aft-most portion of said hull form, and a pair of cambered rudders located near the stern of said hull form with said rudder pressure faces oriented towards said hull form longitudinal centerplane.

In one additional embodiment, the present subject matter includes a combination for affecting the hydrodynamics of a vessel, a transom stern hull form having a hull underside that is substantially horizontal in transverse orientation along the aft-most portion of said hull form, and a stern buttock-line shaping defined by a supercavitating hydrofoil shape.

One additional embodiment of the present subject matter includes a transom stern hull form having a hull underside that is substantially horizontal in transverse orientation along the aft-most portion of said hull form, a pair of endplates having a substantially vertical orientation along the aft half of said hull form waterline length, a pair of cambered rudders located near the stern of said hull form with said rudder pressure faces oriented towards said hull form longitudinal centerplane, and stern buttock-line shaping defined by a supercavitating hydrofoil shape.

DETAILED DESCRIPTION

Figure 1:
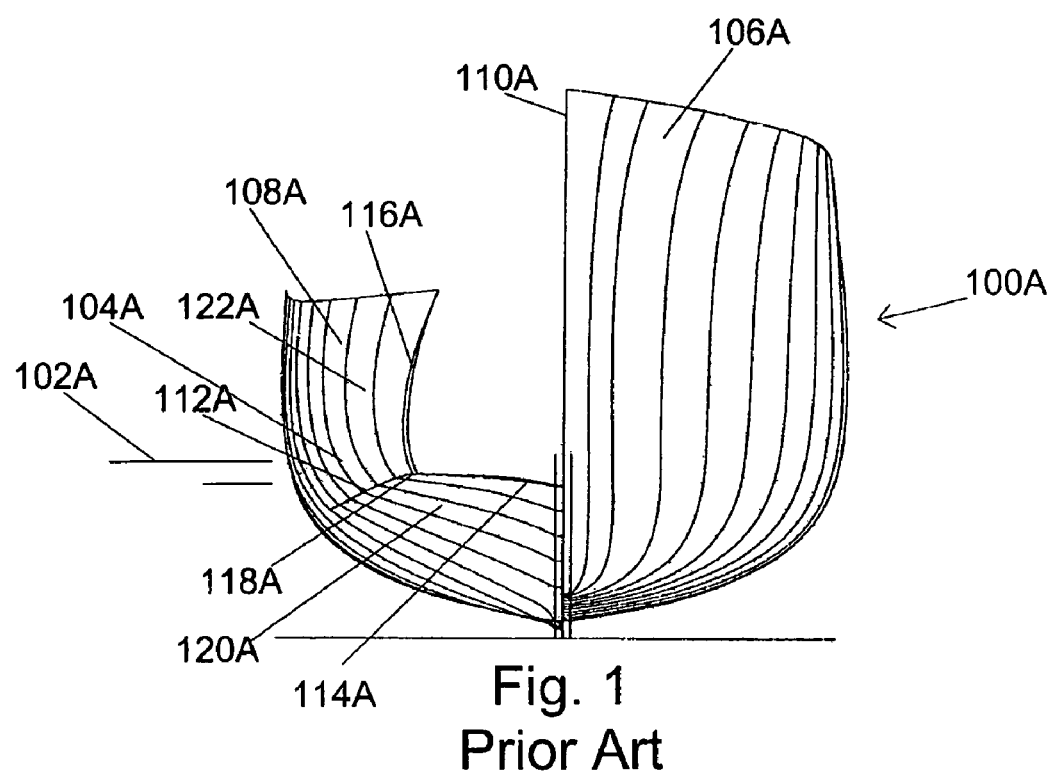
FIG. 1 is a body plan, a graphical representation of the intersections of transverse planes with a hull form, along the length of a hull form, for a transom stern displacement hull, where the right half sections depict stations forward of midships, and the left half sections depict stations aft of midships, on each side of the longitudinal vertical centerplane of the hull form.

In the following description, reference is made to the accompanying drawings that form a part hereof, and in which is shown by way of illustration specific embodiments which is practiced. These embodiments are described in sufficient detail to enable those skilled in the art to practice the invention, and it is to be understood that other embodiments may be utilized and that structural and logical changes may be made without departing from the scope of the present invention. The following description of embodiments is, therefore, not to be taken as limiting, and the scope of the present invention is defined by the appended claims.

Marine vessels carry about 90 percent of world trade. Therefore any new method to reduce hull resistance, and therefore the power required to propel a vessel moving through the water, has great practical value. Resistance reductions of just a few percent are considered significant, as the field is crowded and is considered to be mature. Reductions in fuel use from such small changes in resistance can results in hundreds of thousands, or millions of dollars, of savings over the lifetime of a vessel.

The majority of ships operate in the displacement hull regime. Transom stern design is increasingly important at higher speeds for reducing displacement hull resistance. Proper designs of transom stern displacement hull forms can result in lowered resistance over a wide speed range. This is opposed to bulbous bow designs, which are most effective over more limited speed ranges.

Principles for low resistance transom stern design are not well established. As a result, modern high-speed hull forms sometimes do not have significantly lower resistance than equivalent hull forms designed more than half a century ago.

Various transom stern displacement hull designs and design methods suffer from a number of disadvantages:

(a) The Froude method is the most commonly used method of resistance prediction, but the Froude method provides limited insight into the phenomena which dominate transom stern design: pressure recovery, lift, trailing vorticity and non-linear waves, and the related trim, squat, and flow separation issues. Instead, the Froude method provides design guidance about frictional and residuary resistance (residuary resistance is generally thought of as chiefly comprising wave-making resistance).

The Froude method is more suitable for understanding the resistance effects of slower-speed, cruiser-stern hull forms than the resistance effects of higher-speed, transom stern hull forms. Cruiser-stern hull form designs were previously used for most vessels designs in the early part of the twentieth-century. See Taylor, D. W., "The Speed and Power of Ships," U.S. GPO, 1943.

Installed power in watercraft, and desired speeds, increased throughout the twentieth century. This led to a desire for new hull form designs that were efficient at higher speeds than prior designs had been. Trial-and-error testing revealed that certain kinds of transom stern designs had lower resistance at higher speeds than cruiser-stern hull forms did. However, the Froude method, which is more appropriate for determining slower-speed hull form design resistance, continued to be used for predicting the resistance of higher-speed hull forms.

The Froude method of resistance prediction is not suitable for explaining many transom stern resistance effects observed in physical tests and full-scale ship trials. Both frictional resistance and residuary resistance in the Froude method are approximations that do not properly account for all forms of hull form resistance for high-speed displacement hull forms. Especially in the case of residuary resistance, these approximations become a serious handicap when explaining and optimally benefiting from transom stern resistance benefits.

For example, researchers have noted that different scaling laws than those used in the Froude method are required to predict various components of transom stern resistance. See Gillmer, "Tank Tests of Several Transom-Stern Configurations on Destroyer Escort Type Hulls," USNA Rpt. E-3, December 1961; Karafiath, Gabor, Cusanelli, Dominic, and Lin, Cheng Wen, "Stern Wedges and Stern Flaps for Improved Powering—U.S. Navy Experience," Trans. SNAME, 1999.

(b) Trial-and-error methods still guide transom stern hull form improvements. Stern flaps, and allied devices, have been used to further improve the displacement hull resistance reduction benefits of transom sterns. Such devices include: stern flaps, stern wedges, integrated stern flap-wedges, and stern interceptor plates. Researchers have resorted to costly random searches, by placing various types of stern flap-like devices on the transom stern of hull models, and varying the position of the flap over a series of test runs in a towing tank to determine the optimum geometry for achieving resistance reduction. These prior art improvements have been very derivative in nature, for example combining the concept of a wedge at the stern, with a flap at the stern. See: Karafiath, U.S. Pat. No. 6,038,995, Mar. 21, 2000. General wedge-like forms or stern inflection points have also been proposed or created by other researchers. See: Saito, EP 1,211,171. See also: Sokolov, RU 2,053,914, Feb. 10, 1996. See also: Kenji, JP 2,001,219,892, Aug. 14, 2001.

Presumably, the prevailing assumption in the art has been that stern flap-like devices are the best configuration for reducing transom stern resistance, and hence that incremental improvements to stern flap-like devices are the most profitable avenues of research. For example, 1940's-era German vessels were provided with stern wedges for reducing resistance. By the 1980's some foreign navies, as well as the U.S. Navy, were applying stern wedges to frigate size vessels. By 1989 a stern flap was discovered to be more effective for resistance reduction than a stern wedge on the FFG-7 class vessels. By 1997 an application was made for a combined wedge-flap device that had improved resistance reduction and powering reduction performance. See Karafiath and Cusanelli, U.S. Pat. No. 6,038,995, Mar. 21, 2000. In 2005 a paper was published describing a compromise style of stern flap, called a step flap. See Fung, Siu C., Karafiath, Gabor, and Toby, A. Steven, "The Effects of Bulbous Bows, Stern Flaps and a Wave-Piercing Bow on the Resistance of a Series 64 Hull Form," Fast 2005, St. Petersburg, Russia, incorporated herein by reference. Vertical stern flaps, known as interceptor plates, have also been used on vessels for resistance reduction. Interceptor plates are generally used on higher-speed vessels.

(c) Prior art lacks a systematic description of the underlying behavior of the transom stern displacement hull in motion. Such an understanding would identify opportunities for improving existing designs, would suggest tradeoffs inherent in designs, and would suggest theoretical benchmarks for comparing performance. The salient textbook in the field does not even attempt to address these questions. See: Lewis, Edward V. Ed., Priniciples of Naval Architecture, 3rd. ed., SNAME, 1989. Salient papers in the field also do not thoroughly address these questions.

Prior art transom stern displacement hull design theories are descriptive in nature, suggesting correlation between improved resistance performance and hull geometry. Given empirical knowledge, a designer can approximately estimate the resistance of a new hull form if it is similar to the form of a previously-tested hull. See Fung, Siu C., "Resistance and Powering Prediction for Transom Stern Hull Forms During Early Stage Ship Design," Trans. SNAME, 1991, incorporated herein by reference. See also: Fung, Siu C., and Leibman, Larry, "Revised Speed-Dependent Powering Predictions for High-Speed Transom Stern Hull Forms," FAST 1998, Germany, incorporated herein by reference. Prior art transom stern displacement hull design theories lack a clearly-articulated theory of causation. A more highly-developed theory would thoroughly explain causation, providing specific guidance on what steps are required to achieve a given outcome.

In contrast, planing hull design theory accurately describes causation using first principles and using semi-theoretical, semi-empirical methods. In planing hull design there is a clear understanding in the field, and in the literature, of the fundamental fluid dynamic responses to changes in hull form geometry. This understanding in planing hull design allows design optimization and tradeoffs to be quickly calculated with good accuracy and without model tests. Planing hull theory provides deep understanding of the design tradeoffs involved.

(d) The current transom stern hull design process involves major, unresolved contradictions. Naval architects use basic rules or criteria to define the overall hull form. Some of these basic guidelines or rules include: maintaining a smooth, fair and continuous hull surface; maintaining symmetry of hull and appendages; avoiding or minimizing changes in form or points of inflection in hull shape, or in the underwater hull sectional area curve; minimizing wetted surface area and appendage size; and ensuring that stern buttock lines are gently sloping upwards or horizontal.

Once a hull form is designed that meets these rules or criteria, they are all grossly violated by the addition of a stern flap or allied device, in an effort to further reduce hull form resistance. They are also violated by the addition of chines in the stern. This represents a major contradiction. So too does the addition of transom stern area, which prior art claims is known to add "base drag", but is used in higher-speed displacement hull form designs regardless, because empirical evidence shows a resistance reduction from use of transom stern area.

(e) Prior art transom stern displacement hull design teaches a reductionist view, rather than a holistic view. For example, the literature states that rudders should be designed to minimize total resistance by being as small as possible, not that the hull-rudder interaction should be optimized. Yet when rudders are added to hull form designs, resistance is sometimes reduced, not increased as would normally be expected. Rather than being celebrated as an opportunity to further advance the state of the art in resistance reduction, the literature treats this as an anomaly because it does not fit within the current resistance prediction methodology.

Efforts are occasionally made in the prior art to optimize the propeller-rudder interaction, either to extract some energy from the swirling propeller wash, or to minimize cavitation caused by impingement of the propeller wash on the rudder. Prior art designs twist rudder sections along the span of the rudder to orient rudder sections with the local flow behind the ship and propeller. This minimizes cavitation damage to the rudder at high speed. See Shen, U.S. Pat. No. 5,415,122, May 16, 1995.

(f) Displacement hull forms are most commonly designed to achieve coefficients of form, and only indirectly to achieve specific geometry. Practitioners in the art (naval architects) use basic geometric coefficients to guide hull design decisions. An example of one such design coefficient is prismatic coefficient (Cp), which is the ratio of total hull underwater displaced volume, to the volume defined by: the maximum hull underwater transverse section area times the waterline length.

Geometric coefficients such as Cp are used to approximately predict how changes in hull geometry will change residuary resistance. A vast amount of empirical data, derived from historical physical model tests, is used to estimate what the residuary resistance of a new hull form design will be based upon the geometric coefficients. The new hull form shape is adjusted in the drawings until the geometric coefficients are about equal to those desired, and the hull form appears to be smooth and fair, without unnecessary changes in curvature or inflection points.

The vessel hull geometry is not being directly designed. Instead, the overall hull form geometry coefficients are a goal of the design process, and significant variation in the final resulting hull geometry is possible between two different hull designs with similar overall geometry coefficients. Because significant variations in hull form geometry are possible for two hulls that are designed to identical hull form coefficients, significant variations in resistance and powering are also possible for hulls designed to the same coefficients. For example, researchers found 5-11% variations in effective power requirements between different hull forms having the same hull coefficients. See Pien, Pao C., and Strom-Tejsen, J., "A Hull Form Design Procedure for High-Speed Displacement Ships," SNAME, Diamond Jubilee International Meeting, 1968.

(g) In the few cases where hull geometry is directly designed, such as when computational fluid dynamics (CFD) programs are used, the investigations of hull form alternatives are performed in a costly random search method. Additionally, CFD analyses are still bounded by limitations based upon older hull design methods, such as the use of geometry profile guide curves or geometry coefficient limits that bound the search. Thus, designers do not know what direction is most profitable to investigate, and designers can unintentionally suboptimize the exploration of various designs by limiting the searches using historical hull geometry definition schemes. See Harries, Stefan, and Abt, Claus, "Formal Hydrodynamic Optimization of a Fast Monohull on the Basis of Parametric Design," 5th Int'l. Conf. on Fast Sea Transportation—FAST '99, 31 Aug.-2 Sep. 1999, Seattle, Wash., USA, incorporated herein by reference.

(h) Resulting hull form designs vary significantly in form and performance. A Naval architect cannot clearly answer the question: what exact shape is optimal for transom stern displacement hull design at a given speed? Different designers will provide different answers, and will produce hull designs that when tested exhibit different resistance. This contrasts with planing hull design, where at a given high speed, very clear optimum designs are known. This also contrasts with airfoil design, where for a given Reynolds number, optimum foil shapes are known or can be consistently calculated by different practitioners.

Thus, there is a need in the art for improved theories of transom stern displacement hull design, and a need for designs which provide lower resistance.

FIG. 1 shows a body plan of a prior art transom stern displacement hull form 100A. The hull form 100A is navigating a sea or body of water having static waterline 102A. Station lines 104A show transverse cross-sections at the various stations along the length of hull form 100A, where the right half sections depict stations along a forebody 106A (ahead of amidships), and the left half sections depict stations along a afterbody 108A (aft of amidships), on each side of a longitudinal vertical centerplane 110A of hull form 100A. A distinctive knuckle line, or chine 112A develops towards the aft end of afterbody 108A. A lower transom edge 114A is substantially horizontal, and meets side transom edge 116A and chine 112A in a lower transom corner 118A. The substantially horizontal portion of hull form 100A surface, immediately forward of lower transom edge 114A, is a transom stern hull underside 120A. The substantially vertical portion of hull form 100A surface, immediately forward of side transom edge 116A, is a transom stern hull side 122A.

Figure 2A:
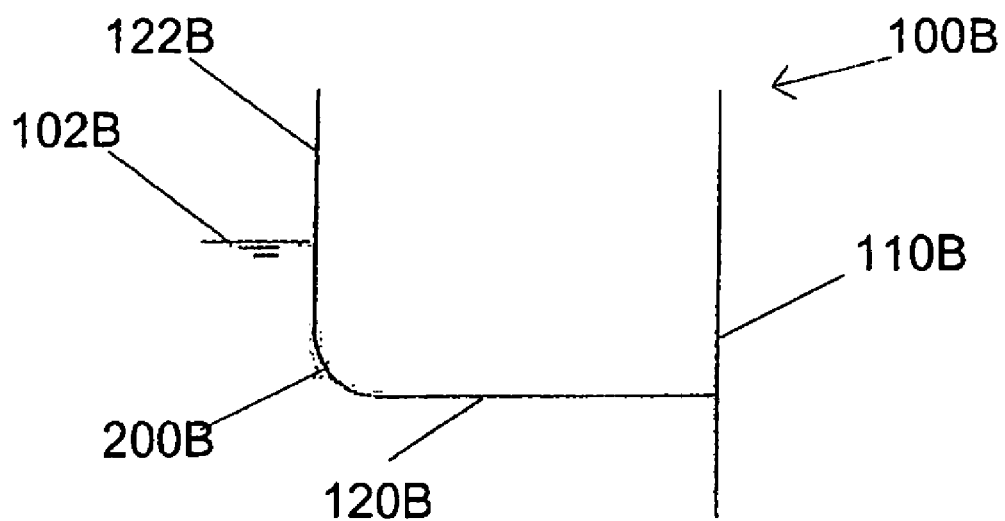
FIG. 2A is a highly diagrammatic, partial, sectional view of a typical transom stern displacement hull aft station.
Figure 2B:
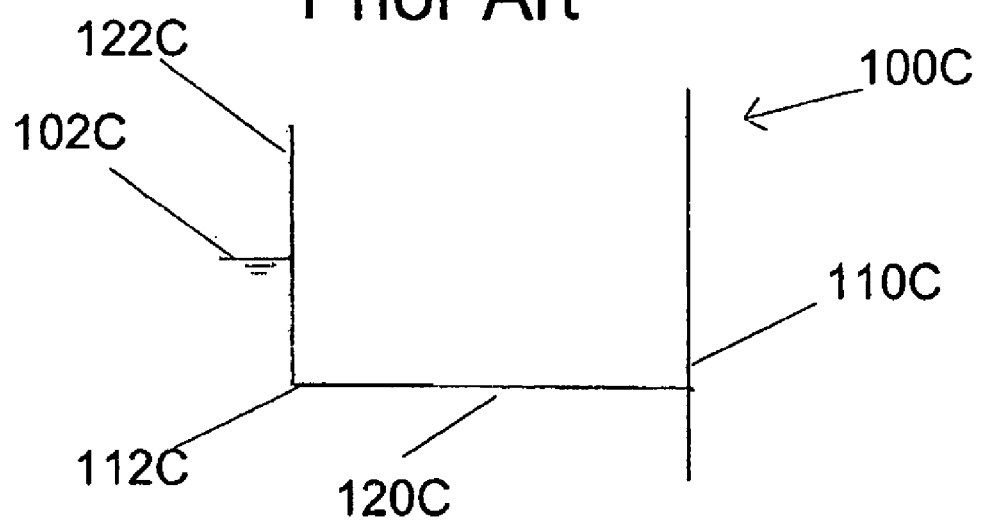
FIG. 2B is a view, similar to the view shown in FIG. 2A, of a stern section (station), wherein the hull form is provided with a sharp chine.

FIG. 2A and FIG. 2B provide examples of transom stern sections. FIG. 2A is a highly diagrammatic, partial, aft sectional view of a variation on transom stern displacement hull form 100A. The view shown is only one portion of the section of hull form 100B to the left of longitudinal vertical centerplane 110B. Static waterline 102B meets the transom stern hull side 122B. Transom stern hull side 122B meets the transom stern hull underside 120B, in a curved transition 200B. FIG. 2B is similar to FIG. 2A, with the difference being that in FIG. 2B the transom stern hull side 122C meets transom stern hull underside 120C, at chine 112C.

Figure 3A:
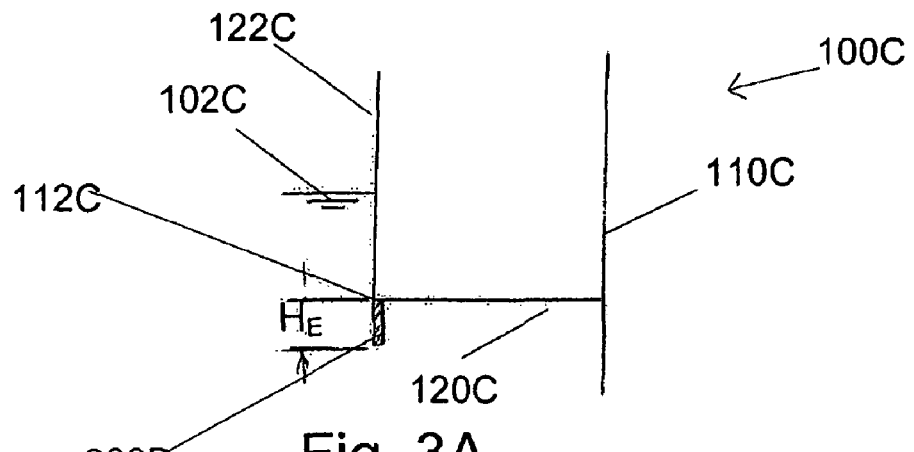
FIG. 3A is a view, similar to the view shown in FIG. 2A, wherein the hull form is provided with an endplate along the transom stern chine.

Some embodiments are shown in FIG. 3A. FIG. 3A is similar to the view shown in FIG. 2B, wherein the hull form shown in FIG. 3A is provided with additional structure in the form of an endplate 300D. In various embodiments, the endplate 300D is coupled proximal the hull side 122D. In some embodiments, the endplate 300D is, firmly attached along the upper edge of endplate 300D to hull form 100C, along the chine 112C. Endplate 300D height $H_E$ is the span of endplate 300D, from its connection with hull form 100C, to the portion of endplate 300D farthest from hull form 100C. In some embodiments, endplate 300D is very thin (e.g., endplate 300D has the smallest thickness practical while still meeting structural requirements to withstand hydrodynamic or other loading that is expected to be experienced in service).

Figure 3B:
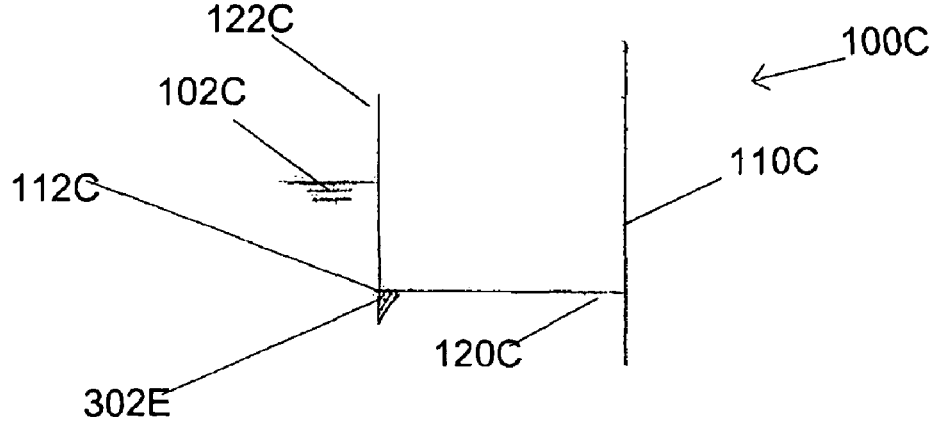
FIG. 3B is a view, similar to the view shown in FIG. 3A, wherein the hull form is provided with a variation of an endplate which is wedge-like in form, along the transom stern chine.

Endplate 300D has a thin, plate-like cross section as shown in FIG. 3A, and is made of similar material as hull form 100C. However, endplate 300D can have different cross sections, such as that shown in FIG. 3B. FIG. 3B is similar to the view shown in FIG. 3A, wherein the hull form shown in FIG. 3B is provided with a modified form of endplate 300D, a faired, or wedge endplate 302E. Endplate 300D is attached to transom stern hull underside 120C directly along chine 112C. However, endplate 300D could be placed in other locations partially inboard or outboard of this location, while still providing a significant benefit.

Endplate height $H_E$ could preferably range between approximately 0.2 percent and approximately 10 percent of the hull form 100C beam measured locally, at the local waterline. In some cases, the endplates have a fixed height from approximately 0.2 percent of a displacement hull form beam measured adjacent the waterline to approximately 5 percent of the displacement hull beam measured adjacent the waterline. However, different sizes may be appropriate for vessels with widely varying proportions of frictional resistance to total resistance at operating speed.

The endplate could be made of other suitable materials for marine construction, such as metal, composites, wood, concrete, or even of flexible materials such as rubber or foam to avoid damage during docking or other events during which contact is possible between hull form 100C and other objects.

Figure 3C:
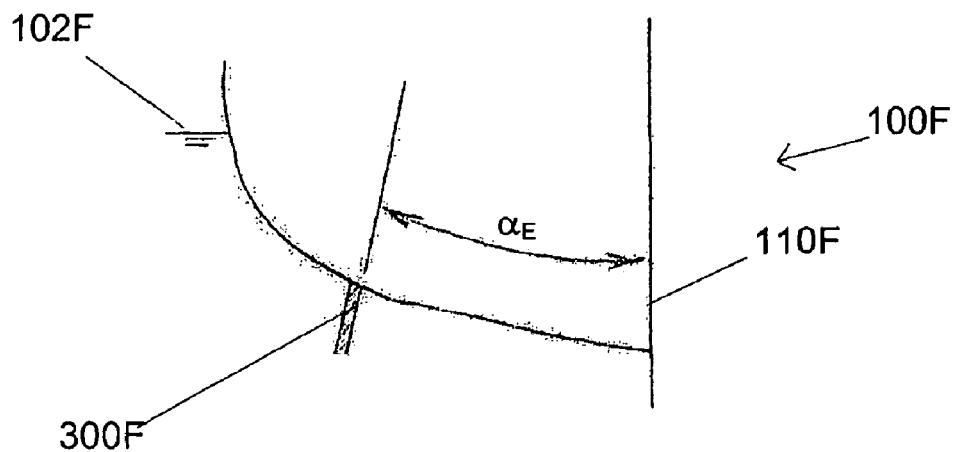
FIG. 3C is a view, similar to the view shown in FIG. 3A, wherein the hull form is slightly less distinct in the transom stern chine or turn-of-the-bilge region, and the hull is provided with an endplate.

FIG. 3C shows a partial section similar to FIG. 3A, except that the example shown is for a transom stern hull form 100F lacking a distinct chine 112C, or lacking a sudden curved transition 200B between transom stern hull underside 120C and transom stern hull side 122C. FIG. 3C illustrates endplate 300F angle $\alpha_E$, which is the angle of the span of the endplate in relation to the longitudinal vertical centerplane 110F of the hull form 100F. In various embodiments, endplate 300F remains substantially vertical, so that the endplate 300F angle $\alpha_E$ is preferably between plus or minus 20 degrees from vertical. Accordingly, endplates each are generally aligned within approximately 20 degrees of the vertical plane. However, inclusion of endplate 300F may still prove beneficial at other angles.

Figure 4A:
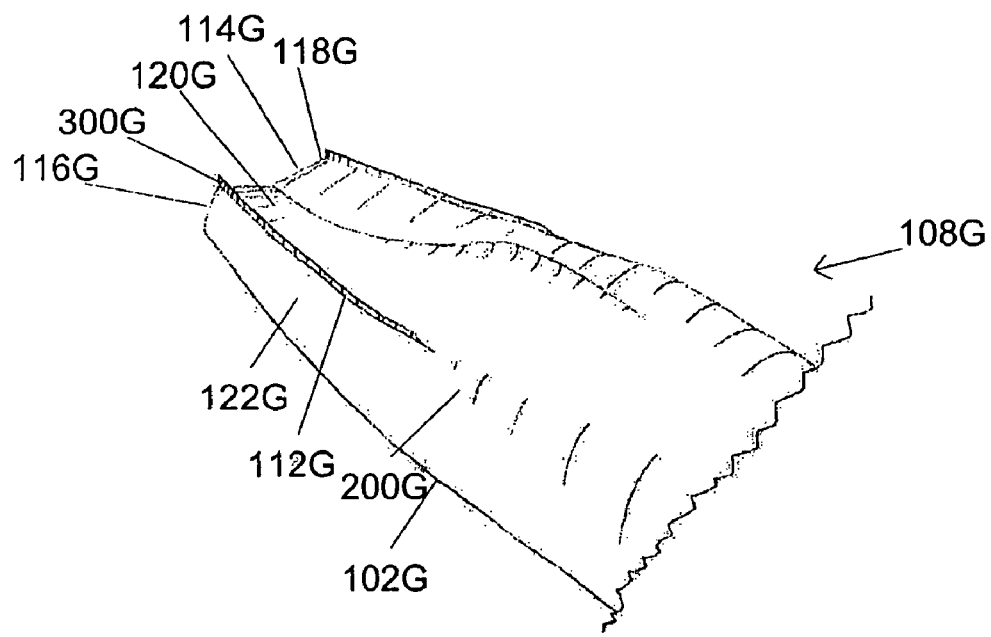
FIG. 4A is a perspective view of the stern construction according to some embodiments, showing the surface thereof below the waterline, when viewed from below the waterline, wherein the hull form is provided with chine endplates.

FIG. 4A shows a perspective view of the stern construction according to some embodiments, showing the surface thereof below static waterline 102G, when viewed from below the waterline, wherein the hull form 100G is provided with a pair of substantially vertical endplates 300G along chine 112G. Afterbody 108G is comprised of transom stern hull underside 120G, joining transom stern hull side 122G at chine 112G. A pair of endplates 300G, are connected to afterbody 108G along left and right (port and starboard) chines 112G. The curved transition 200G develops in the afterbody 108G forward of chines 112G. Further forward towards midships, both chines 112G and curved transition 200G fade away, and there is no longer a distinct difference between transom stern hull underside 120G and transom stern hull side 122G.

Endplates 300G on afterbody 108G extend forward between 1 and 40 percent, inclusive, of hull form 100G waterline length. The right and left endplates extend along a hull length from approximately the aft end of the hull toward a bow of the hull from about 1 to about 40 percent of hull waterline length. The term approximately, used in relation to endplates 300G, indicates that some embodiments, starting from a position at the lower transom edge 114G, while additional embodiments start near the lower transom edge 114G, but not at it. The endplates 300G preferably extend at least 10 to 30 percent of hull form 100G waterline length, for vessel of normal proportions of frictional resistance to total resistance.

Figure 4B:
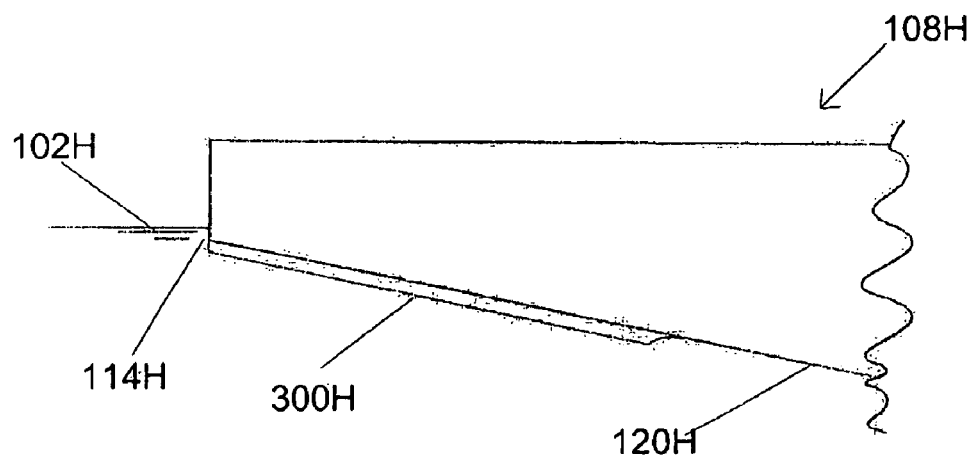
FIG. 4B is a highly diagrammatic, partial (stern), side elevation view of the stern construction according to some embodiments, wherein the hull form is provided with chine endplates.

FIG. 4B is a highly diagrammatic, partial (stern), side elevation view of the stern construction according to some embodiments, wherein the afterbody 108H is provided with chine endplates. Afterbody 108H is comprised of transom stern hull underside 120H, ending at lower transom edge 114H. A pair of endplates 300H, are connected to afterbody 108H along left and right (port and starboard) sides of transom stern hull underside 120H. Afterbody 108H has a static waterline 102H.

The manner of using the hull form 100G with the endplate 300G of FIG. 4A is identical to that for prior art transom stern hull forms in present use, with the notable exception that the inventive endplate 300G results in greater resistance and powering reduction than does the prior art transom stern hull form 100A of FIG. 1 alone.

As shown in FIGS. 1, 2A and 2B, prior art transom stern hull forms 100A, 100B, 100C, previously included curved transition 200B and chine 112A, 112C.

The action of the endplate is as follows. In FIGS. 4A and 4B, afterbody 108G, 108H, is moving forward through a body of water with static waterline 102G, 102H. As the water passes along the afterbody 108G, 108H, some water flows along the transom stern hull underside 120G, 120H. Other water flows over the curved transition 200G which separates the transom stern hull side 122G, and the transom stern hull underside 120G. The curved transition 200G allows water to flow between the transom stern hull underside 120G and the transom stern hull side 122G without creating excessive drag or eddy formation.

Farther aft, towards the lower transom edge 114G, the velocity of water flowing along the transom stern hull underside 120G is reduced. The shaping of the transom stern hull underside 120G typically includes some degree of fore-aft curvature, which changes the path of fluid flow and reduces the velocity of the water. The reduction in water velocity towards the lower transom edge 114G results in higher pressure according to Bernoulli's equation. The higher pressure generated under the transom stern hull underside 120G generates a forward thrust component on the transom stern hull underside 120G, resulting in reduced resistance. A vertical thrust component on the transom stern hull underside 120G also reduces resistance by reducing displacement of aftbody 108G.

One goal of transom stern design is to reduce resistance by maximizing the high pressure generation (also known as "pressure recovery") under the transom stern hull underside 120G. Chine 112G is found on prior art transom stern hulls, and can increase the beneficial pressure generation on the transom stern hull underside 120G. Chine 112G provides sharp flow separation between water flowing along transom stern hull underside 120G that might escape over chine 112G to transom stern hull side 122G. In the aft-most region of transom stern hull underside 120G, where maximizing pressure generation is desirable for hull resistance reduction purposes, chine 112G provides an aspect ratio-augmenting device to increase the effective aspect ratio of the transom stern hull underside 120. Another way to state this is to say that the chine 112G increases the cross-flow drag coefficient.

Endplate 300G further augments the effects of chine 112G, allowing greater pressure generation under transom stern hull underside 120G. Endplate 300G terminates near or at lower transom edge 114G and lower transom corner 118G. Endplate 300G provides pressure generation benefits even when chine 112G remains fully immersed (in other words, ventilation of transom stern hull side 122G is not required for beneficial effects to occur.)

As shown in FIGS. 3A, 3B, and 3C, endplate 300D requires an endplate height or projection from transom stern hull underside 120C to modify the cross-flow of water along the transom stern hull underside 120C. A perfectly vertical endplate 300D is not required for achieving the desired operation, as a angled endplate as shown in FIG. 3C, or an endplate wedge 302E as shown in FIG. 3B could provide a similar operative result.

A distinction should be drawn between the hydrodynamic principles for a displacement hull versus those for a planing hull. Embodiments of the present subject matter relate to displacement hull design.

Displacement hulls are used for slower-speed vessels, wherein the vast majority of the weight of the vessel is supported in a displacement mode, by buoyancy. The operating speed of displacement hulls is approximately limited to a speed-to-length ratio of between zero and 3.00, where speed-to-length ratio is defined as the vessel speed in knots divided by the square root of waterline length of the vessel in feet. Some embodiments include a transom stern displacement hull to operate at a speed-to-length ratio of from about 0.80 to about 3.00.

The wetted surface area of displacement hulls does not change significantly between the at-rest position and the top speed position, changing at most by several percent. Chines are not used as stream or spray deflectors. The hydrodynamic forces acting upon displacement hulls at top speed are typically insufficient to create trim angles of more than several degrees, and the changes in trim experienced by a displacement hull in forward motion do not create a significant increase in resistance.

Planing hulls are used for higher-speed vessels, wherein the vast majority of the weight of the vessel is supported in a planing mode, by hydrodynamic lift forces. The beginning of the planing regime is sometimes defined as the speed at which sinkage becomes positive (that is, the speed at which the center of gravity begins to rise).

The wetted surface area of planing hulls changes significantly between the at-rest position and the top speed position, with wetted surface area reductions of tens of percent being common between zero speed and top speed conditions. Chines and other discontinuities are used on planing hulls as stream deflectors or as spray deflectors. Chine plates are often angled down at an angle of approximately 25 to 35 degrees below the horizontal, to provide for effective spray deflection. Changes in trim are of major importance for optimally minimizing planing hull resistance. The hydrodynamic forces acting upon planing hulls at top speed are substantial and can cause changes in trim of five or ten degrees. Naval architects pay particular attention to ensuring that a planing hull achieves a reasonably efficient trim angle for minimum resistance at speed. Devices are frequently used to change the trim of planing hulls at speed.

Disclosed herein are two insights relevant to the operation of transom sterns. As disclosed herein according to several embodiments, these insights provide new means to design, and to optimize, transom stern displacement hull forms. My new theory of transom stern displacement hull design provided the rationale for applying the various inventive elements described in the various embodiments of this application. My new theory also explains why the various inventive elements work in a complementary manner.

The first major insight of the new theory is that Eggert's pressure/shear resistance model is more helpful in understanding transom stern resistance effects than is the Froude model. Pressure recovery is a key goal of transom stern design. The Froude model, with its emphasis upon wavemaking resistance, becomes less important to understanding transom stern design at higher speeds.

The second major insight of the new theory is that the transom stern of displacement ships can be envisioned as acting as a supercavitating hydrofoil. The design of a displacement hull transom stern can be thought of as a problem of optimizing the transom stern hull underside into an efficient supercavitating hydrofoil configuration to maximize lift and pressure recovery effects, while minimizing non-linear stern waves or trailing wake vorticity.

The goals of high-speed transom stern displacement hull design to achieve low resistance are: (a) pressure recovery, (b) lift, and (c) reduction of non-linear stern waves/trailing wake vorticity. These goals are complementary. With these goals in mind unusual stern configurations become attractive, and contemporary designs have some obvious drawbacks.

Elements of stern design that contribute to these goals include: zero or negative deadrise at the stern to maximize transom stern underside lift; stern buttock lines with significant camber resembling a fully-ventilated, supercavitating hydrofoil to generate lift and pressure recovery; chines and endplates along the edges of the transom stern underside for aspect ratio augmentation, (also known as endplate effects); asymmetric (cambered) rudders or fins serving as winglets or endplates; and double-faced transoms for reduction of non-linear waves and trailing wake vorticity. These design elements can be combined to produce greater resistance reduction effects than by using these design elements individually.

While I believe the residuary resistance benefits discovered occur because of a pressure recovery, lift, and reduction of trailing wake vorticity effect, I do not wish to be bound by this.

Prior art researchers have identified the beneficial resistance aspects of lift, pressure recovery, trim changes, and propeller interactions caused by changes to transom stern displacement hull design (such as through the addition of stern flaps). What prior art researchers have not done is clearly articulate the logical conclusion stemming from this research. This conclusion is that transom stern displacement hulls should be designed as supercavitating hydrofoil configurations to maximize lift and pressure recovery effects, and that additional appendages can be used to improve the effect. A follow-on conclusion is that many existing theoretical tools from other fields, previously applied in the fields of supercavitating hydrofoil, winglet, aircraft, and planing hull design, can be profitably applied to the task of understanding and improving transom stern displacement hull design.

There is a model of ship resistance that receives much less attention in contemporary ship resistance discussions than the Froude model. This model could for current purposes be called the "Pressure/Shear" model. It divides the total ship resistance into two components: pressure forces acting normal to the ship hull surface, and shear forces acting tangentially to the ship hull surface. Much model testing work was done to compare the Pressure/Shear model to the Froude method by U.S. Navy Capt. E. F. Eggert in the 1930's. See Eggert, Capt. E. F., "Further Form Resistance Experiments," Trans. SNAME, Vol. 47, 1939, pp. 303-330.

Eggert convincingly showed in detailed model test investigations that:

(a) Residuary resistance was attributable to the integrated pressure over the hull surface once frictional resistance was subtracted. The difference between the high bow pressures and the low stern pressures acting on the hull resulted in pressure, or residuary, resistance.

(b) The part of the hull most responsible for the pressure, or residuary, resistance is the region along the surface nearest to the waterline.

Eggert's pressure/shear model leads to an important conclusion. Once we have lowered the pressure at the bow as much as possible through fining the entrance, the obvious secondary approach would be to recover as much pressure as possible at the stern, close to the waterline. This will reduce the negative pressure region at the stern and will reduce resistance. Thus, the transom stern displacement hull needs to recover as much pressure as possible from the flow along the run (stern region) in order to lower ship residuary resistance.

Pressure recovery is achieved by creating camber, or inflection points, in the form of a body, to create deceleration of fluid flow (and therefore increased pressure). This leads to the second major insight of the new theory: the transom stern of displacement vessels can be envisioned as acting as a supercavitating hydrofoil. Water flows along the relatively flat transom stern hull underside, but does not flow over the upper surface of the same hull plating. The flow exists only on the lower side of the transom stern hull underside, the upper side being covered with a cavity of gas (atmosphere). Thus, by definition, the transom stern hull underside operates as a supercavitating hydrofoil. Curving the stern buttock lines, or adding stern flaps to the transom, effectively adds camber to the transom stern hull underside. We can estimate the benefits and optimal configurations for stern cambering to reduce ship resistance, by using supercavitating hydrofoil theory.

Supercavitating hydrofoil theory provides useful guidance on how to shape transom stern hull undersides. Flaps are more efficient lift generators than flat plates using angle of attack alone. But cambered shapes have less drag for a given lift than flapped plates. Therefore, when possible, use of cambered lifting foil sections is preferable to use of flapped lifting sections. See Tulin, M. P., and Burkart, M. P., "Linearized Theory for Flows About Lifting Foils at Zero Cavitation Number," DTMB Rpt. C-638, February 1955.

If flapped sections are used, theory demonstrates that for any flap angle there is an optimum flap chord-to-length ratio to maximize the lift-to-drag ratio. Theory shows that using lower flap angles, and larger flaps, results in a wider speed range of beneficial performance. However theory also shows that such a configuration will have a lower peak level of beneficial performance than use of smaller flaps at larger flap angles. Prior art researchers relied upon numerous model tests to reach some of these conclusions about the tradeoffs involved in stern flap design, rather than this simple theory. See: Karafiath, U.S. Pat. No. 6,038,995, Mar. 21, 2000.

The best design for a transom stern hull underside would be to use a supercavitating hydrofoil shape with the highest lift-to-drag ratio possible, while avoiding use of such a radical shape that separation of the flow over the hydrofoil occurs. A Johnson 5-term or a Johnson 3-term supercavitating hydrofoil shape would represent very high lift-to-drag ratio sections suitable for transom stern displacement hull underside shaping. These shapes have higher lift-to-drag ratios than do simple circular arcs or other simple cambered shapes commonly used to design transom sterns. Johnson 3-term and Johnson 5-term supercavitating hydrofoil sections also have higher lift-to-drag ratios than flapped plate configurations, configurations similar to the stern flap designs used by many prior art researchers.

Johnson, 1961, provides an excellent development of the theory needed to directly calculate section characteristics at various aspect ratios, depths of submergence, angles of attack and geometry (design lift coefficient camber). See Johnson, Virgil E., "Theoretical and Experimental Investigation of Supercavitating Hydrofoils Operating Near the Free Water Surface," NASA TR R-93, 1961. Clement provides derivative, empirical-based extensions of this work for planing boat forebody design applications. He relies on previously calculated section characteristics in chart form. See NRSDC Rpt. 3011, March 1969.

Cambered stern buttock lines and stern flaps are generally observed to be beneficial (net resistance reducing) at moderate to high speed, and detrimental (net resistance increasing) at lower speeds. There exists a crossover speed, some threshold tradeoff speed at which the camber exceeds breakeven in terms of total resistance effects. Because the lift-to-drag ratios of supercavitating hydrofoil sections are higher than simple circular sections or other simple sections previously used to shape displacement vessel stern buttock lines, it is likely that supercavitating hydrofoil sections would also be beneficial for transom stern hull designs at lower threshold speeds than for current designs.

Much of the benefit of transom stern displacement hull designs using camber, flaps, etc. can be calculated using supercavitating foil theory. A designer can approximate the transom stern hull underside as a supercavitating hydrofoil shape of a span, chord, and camber approximating that of the actual hull shape, and can also include transom flap effects using flapped supercavitating hydrofoil theory.

My theory primarily makes use of two references for basic supercavitating hydrofoil lift and drag analysis. See: Johnson, Virgil E., "Theoretical and Experimental Investigation of Supercavitating Hydrofoils Operating Near the Free Water Surface," NASA TR R-93, 1961. See also: Tulin, M. P., and Burkart, M. P., "Linearized Theory for Flows About Lifting Foils at Zero Cavitation Number," DTMB Rpt. C-638, February 1955. Stern buttock lines are usually not oriented in a perfectly horizontal orientation. The lift produced on the stern aftbody is therefore acting on a tilted surface. If the lift vector produced is angled forward, then a portion of the lift force produces a forward thrust. This thrust reduces residuary resistance. It might seem surprising that the design of a ship which is 95-99.5% supported by buoyancy, and only 0.5-5.0% by dynamic lift, can be strongly influenced by hydrodynamic lift considerations. However, the residuary resistance of a typical high speed hull may be only 2.8% of displacement. So transom stern designs which produce a lift force on the order of 1% of displacement can have a dramatic influence upon residuary resistance, when the lift vector is oriented in such a way that a portion of the lift produces forward thrust.

Lift reduces hull displacement, creating another residuary resistance benefit. Additionally, lift changes hull trim angle. The change in hull trim angle can have a slight resistance benefit. See: Cusanelli, D. S., and Hundley, L., "Stern Flap Powering Performance on a Spruance Class Destroyer: Ship Trials and Model Experiments," ASNE Naval Engineers Journal, Vol. 111 No. 2, pp. 69-81, March 1999. See also: Gurnee, LT W. T., USN, and Montgomery, LT Robert, C., USN, "An Investigation of the Effects of Transom Stern Parameters on Bare Hull Resistance for Destroyer Type Ships" M. S. Thesis, Webb Inst. of Naval Arch., Jun. 14, 1968.

Lift-to-drag ratio is optimized when the transom stern hull underside deadrise angle is zero, or slightly negative up to approximately negative 12 degrees (e.g., due to an effective aspect ratio effect). According to some embodiments disclosed herein, the hull bisected along its length by a vertical centerplane. The hull include a hull underside along an aft portion of the hull, the hull underside having a deadrise angle of from approximately −12 degrees to approximately 10 degrees, with the hull underside bounded on a right lateral side of the hull by a right hull side and on a left lateral side of the hull by a left hull side, the right and left hull sides each extending from the hull underside to a waterline and beyond the waterline.

Many transom stern hull forms have sharp chines, also known as knuckle lines, running along the aft portion of the hull. The transom chine can reduce total resistance when underway. The resistance reduction benefit of chines arises because there is pressure recovery and lift on the underside of the transom. While chines are generally thought of as helping provide clean flow separation, they can also be thought of as providing an end condition for the stern "lifting surface". By using a sharp chine, the effective aspect ratio of the transom stern underside lifting surface is augmented (or another way to model the effect is to say that the cross-flow drag coefficient is increased).

When chines are used it is critical that they are sharp. "Soft chines" are present on some prior art designs, but should be avoided if at all possible (especially at the stern), because even small relative radii produce large losses in lift. See Shuford, Charles L. Jr., "A Theoretical and Experimental Study of Planing Surfaces Including Effects of Cross Section and Plan Form," NACA Rpt. 1355, 1957. While the tests in Shuford, 1957, were for planing boat hulls, the losses in lift from using "soft chines" on transom stern displacement hulls would be similar.

Even more advantageous than using sharp chines on a transom stern would be the use of chine strips or small endplates along the chine. Endplates are known to increase the lift generated by lifting surfaces through aspect-ratio augmentation effects. In some cases the additional wetted surface area (and therefore frictional resistance) of these appendages will be more than offset by the residuary resistance reduction affects attributed to them.

Johnson, 1961 states that supercavitating hydrofoils experience the same effects as fully wetted foils do when their aspect ratios are adjusted from infinite (two-dimensional foils) to finite (three-dimensional foils). In other words, the induced drag and induced angle of attack as a function of aspect ratio, taper, and endplates are the same for supercavitating hydrofoils as they are for fully wetted foils.

If we assume that the transom stern hull underside functions as a supercavitating hydrofoil, then endplates can be expected to increase the lift of cambered transom stern displacement hull undersides just as endplates would do for a conventional supercavitating hydrofoil. Tests have shown that endplates increase the lift-to-drag ratio of supercavitating hydrofoils. See: Baker, Elwyn S., "Review of Supercavitating Hydrofoil Experiments 1955 through 1972," DTRC Rpt. SPD-567-01, June 1975.

The use of double-faced transoms effectively tapers the transom stern hull underside lifting surface. The expected result of tapering would be an improvement in the lift-to-drag ratio of the hull form. Although identifying the effect with reduced vortivity, and not with tapering of a lifting surface, Gillmer noted the resistance benefits of double-faced transom sterns that were model tested.

One goal of transom stern hull design should be to reduce non-linear trailing wake, or momentum losses in the trailing wake behind the stern. Vorticity near the stern can be reduced by changing the stern waterline planform. Changes in the planform effectively achieved tapering of the transom stern hull underside lifting surface. See: Gillmer, "Tank Tests of Several Transom-Stern Configurations on Destroyer Escort Type Hulls," USNA Rpt. E-3, December 1961. Other researchers have noted that controlling the exit velocity of water under the lower transom edge is critical to reducing momentum losses and reducing non-linear trailing wake. See: Iwasaki, Yasunori, et al, "Studies on Relationship between Water Surface behind Stern and Stern End Form of Fine Ships," Jrnl. of the Society if Naval Architects of Japan, Vol. 180, December 1996, pp. 13-20. The use of other elements mentioned here, such as winglets, also helps reduce the intensity of trailing wake vorticity.

The transom stern hull underside can be considered to act as a supercavitating hydrofoil lifting surface. Winglets are often added to lifting surfaces to increase lift, or to increase the lift-to-drag ratio of the lifting surface. Likewise, winglets can be used on transom stern designs to reduce resistance. Some transom stern hull forms use rudders, fins, or skegs to provide maneuverability and directional stability. Suitable modification of the rudder or skeg design into more effective winglets (or large endplates) can accomplish reductions in total transom stern displacement hull form resistance.

Camber can improve the beneficial resistance effects of twin rudders. The rudders reduce resistance by: (a) reducing the induced drag of the transom stern hull underside, which is a lifting surface; (b) increasing pressure recovery beneath the transom stern hull underside; and/or (c) creating a small forward lift component.

Aircraft design theory teaches that to be most effective, winglets should be designed to develop significant side forces. Therefore camber should be designed into rudders that are meant to serve as winglets for the underside of a transom stern. Additionally, high aspect-ratio airfoils suit this purpose much better than short, uncambered endplates do. Winglet theory also states that the lower winglet has a pressure side facing inwards (towards the main wing). Rudders designed to reduce resistance should be cambered with the pressure face oriented towards the hull form vertical centerplane.

Unlike simple endplates, winglets have lower drag than an equivalent increase in lifting surface span (Raymer, 1989), in some cases producing a lift-drag ratio increase twice as large as an equivalent span increase (Whitcomb, 1976). Winglets modify the flow around the tip of a lifting surface by redistributing the tip vortex. Winglets alter the spanwise distribution of circulation along the wingspan and hence the structure of its trailing vortex system (McCormick, 1979). The total strength of the trailing vortex or the total circulation is the same for a lifting surface independent of the winglet design. However the winglets create a vertical diffusion of the tip vortex flow just downstream of the wingtip, leading to an induced drag reduction (Kuethe and Chow, 1998). Through use of properly-chosen cambered foil sections winglets can produce a small forward thrust that more than offsets their own added drag.

See Raymer, Daniel P., "Aircraft Design: A Conceptual Approach," American Institute of Aeronautics and Astronautics, Washington, D.C., 1989. See also Whitcomb, Richard T., "A Design Approach and Selected Wind-Tunnel Results at High Subsonic Speeds for Wing-tip Mounted Winglets," NASA TN D-8260, July 1976. See also McCormick, Aerodynamics, Aeronautics and Flight Mechanics, John Wiley and Sons, Inc., 1979. See also Kuethe and Chow, Foundations of Aerodynamics, 5th ed., John Wiley and Sons, Inc., 1998. Thick rudder sections cause "blockage" of the flow under the transom, slowing the flow ahead of the rudder and creating pressure recovery (and therefore resistance reduction).

Optimum rudder angle tests are often performed at one speed on ship models, to determine the lowest-resistance neutral steering angle for twin rudders to be fixed at. However the flow field at the ship's stern can change appreciably at different speeds because of wavemaking, etc., and the flow velocities, cavitation considerations and the like also vary with speed. Therefore many high-speed transom-stern displacement hulls could probably benefit from having the neutral steering rudder angle for twin rudders be adjustable versus speed.

My theoretical analysis appears to reflect reality as determined by stern flap and no-stern flap model tests conducted by the U.S. Navy on FFG-7 ship models. My supercavitating hydrofoil analysis calculates at 26 knots full-scale ship speed that the FFG-7 displacement will be reduced by 1.07%. Reported model test results show displacement reduced at 26 knots by 1.0%. My analysis calculated a residuary resistance savings of about half of the savings actually measured in model tests. The reason that calculated resistance reductions are less than measured resistance reductions is probably a result of my calculations ignoring other effects such as: the interaction between the ship's wave train and the pressure buildup at the stern caused by the stern flap; trimming of the ship caused by flap-generated lift at the stern; and propulsion interactions. These ancillary effects have previously been discussed and partially explored by Karafiath et al, 1999. See Karafiath, Gabor, Cusanelli, Dominic, and Lin, Cheng Wen, "Stern Wedges and Stern Flaps for Improved Powering— U.S. Navy Experience," Trans. SNAME, 1999.

The inventor built a hull model, removable stern model sections, and model appendages, and paid to conduct private model tests at the Webb Institute Robinson Model Basin Towing Tank, in Glen Cove, N.Y. in March, 2003. The tests confirmed the residuary resistance reduction benefit of endplates, of increasing supercavitating hydrofoil camber of buttock lines, of cambered rudders, and of anhedral (negative deadrise angle) transom stern sections.

Model test results showed that the model fitted with endplate strips that were located along the last 7.2% of waterline length, with a height equal to 2% of local transom stern hull underside beam, reduced hull residuary resistance by approximately 0.7% at a speed-length ratio of 1.5, and reduced residuary resistance by approximately 1.3% at a speed-length ratio of 2.0. Trim angle was also slightly reduced at a speed-length ratio of 2.0.

The endplate strips used represented 0.38% of hull wetted surface area. The actual wetted surface area could be reduced by one-third while still achieving a similar residuary resistance reduction effect, by using plates instead of the square cross-section endplate strips that were used in the model tests. Larger endplate heights were also tested and found to have diminishing benefits, in terms of residuary resistance reduction versus the additional wetted surface area.

Model test results showed that the model sterns fitted with increasingly large values of two-dimensional design lift coefficient, 5-term Johnson camber shaping, had increasingly large reductions in residuary resistance over the parent hull shape. For example, the residuary resistance of a hull with a two-dimensional design lift coefficient of 0.050, 5-term Johnson camber shape, was as much as 9-10% lower than the residuary resistance of a hull with a two-dimensional design lift coefficient of 0.039, 5-term Johnson camber shape.

The models tested used Johnson 5-term camber shaping starting at approximately station 14 and ending at station 20 (wherein station 0 represents the forward-most station, and station twenty represents the aft-most station of a hull form). The camber shaping baseline was rotated in order to fair the transom stern hull underside into the camber shaping.

Twin-rudder appendages were tested on the hull model: one symmetrical, and one cambered to produce a lift coefficient of 0.40, with the pressure side facing inboard. Both pairs of rudders had a thickness of approximately 12% of local transom stern beam. Each rudder had a NACA 0021 section. Model test results showed that the model fitted with cambered rudders, when adjusted to the best rudder angle for resistance minimization, had only 94.9% of the residuary resistance of the hull without rudders. This was better than the 96.4% of residuary resistance achieved using the optimum rudder angle using the symmetrical (uncambered) rudders. All of these rudder tests were conducted at a speed-length ratio of 2.0.

A further model test was conducted using a pair of cambered rudders that had a maximum thickness of approximately 4.5% of local transom stern beam. The residuary resistance of this configuration was 99.4% of that of the hull without rudders, at a speed-length ratio of 2.0.

To the inventor's knowledge, the combination of a transom stern displacement hull with relatively small height endplates for resistance reduction, with varying buttock line camber in the form of supercavitating hydrofoil sections of multi-term Johnson shapes, with paired cambered rudders with pressure side facing inboard for resistance reduction, and with anhedral (negative dihedral or negative deadrise angle) stern sections for resistance reduction, had never been tested by anyone prior to the Webb tow tank tests.

Endplate-like devices have been commonly used in other configurations, and for other uses, than for the one envisioned by the inventor for transom stern displacement hull resistance reduction. Planing craft have made use of short length, wide height or span fins aft to increase directional stability or reduce side-slip. See Farrington, U.S. Pat. No. 3,045,629, Jul. 24, 1962.

Endplate-like devices are used near the stern of planing boat hulls to maintain flow continuity past aft steps in the hull, to sustain ventilation of the aft bottom surface. See Stanford, U.S. Pat. No. 4,915,048, Apr. 10, 1990. Endplate-like devices are also used to retain captured air in order to reduce planing craft or surface-effect-craft frictional resistance. See Harley, U.S. Pat. No. 5,570,650, Nov. 5, 1996. Certain planing boat chine shapes have also been developed to provide a more cushioned ride in waves, by increasing under-bottom air entrapment during slamming events. See Stessl, AU9,336,937, Oct. 21, 1993.

Side strips have also been previously used to contain wave-canceling surface-plate style hulls, and to retain air in order to reduce wetted surface frictional drag. See Eder, U.S. Pat. No. 6,112,687, Sep. 5, 2000.

Chine devices similar to endplates have also been used on planing craft, and on semi-displacement craft, to deflect spray and to reduce resistance. For example, spray strips that are substantially horizontal in orientation have been used to reduce spray, reduce wetted surface area, and to help a semi-displacement craft partially plane. See Burgess, U.S. Pat. No. 2,185,430, Jan. 2, 1940. Angles side strips have also been used for improved planing characteristics. See Schell, U.S. Pat. No. 5,784,977, Jul. 28, 1998.

Displacement craft have made use of large fins and chines in the forward portion of the hull, tapering towards the stern, to reduce kayak resistance. See Franke, U.S. Pat. No. 6,834,605, Dec. 28, 2004.

Older-style displacement hull forms, lacking a transom stern, have previously been fitted with enormous side-hull vertical fins for resistance reduction purposes. See Richardson, U.S. Pat. No. 1,220,558, Mar. 27, 1917. See also Andrews, U.S. Pat. No. 7,449, Jun. 25, 1850. These prior art approaches to using endplate-like fins consisted of fins running nearly the full length of the vessel, and nearly the entire vertical span from the waterline to the keel. These very large prior art endplate-like devices would not produce an acceptable residuary resistance reduction-to-frictional resistance increase ratio, as their large wetted surface area would cause more frictional resistance increase than any savings from residuary resistance decreases. The present embodiment consists of a more useful, critical range of endplate design and use than the prior art range, based upon a better understanding of the hydrodynamic theory of operation of hull form design.

Short, wider endplate-like devices than those described in the present embodiment have also been used on displacement hulls for protecting propellers from ice damage, or to modify the flow field around the propeller to produce improved propulsive performance. See Carlton, J. S., Marine Propellers and Propulsion, Butterworth-Heinemann Ltd., 1994. Wide endplate-like devices have also been utilized to reduce vessel motions in waves. See Bystedt, U.S. Pat. No. 5,535,690, Jul. 16, 1996.

Stepped planing boats have been designed and tested applying 3-term Johnson camber sections to their planing surfaces, exhibiting much lower resistance than more conventional forms.

Prior art made uses of twisted rudders to achieve propulsor swirl energy recovery. Prior art also made use of twisted and cambered rudders to minimize cavitation. See: Shen, U.S. Pat. No. 5,415,122, May 16, 1995. Prior art also used various neutral rudder angles, to select the optimum neutral rudder angle for minimizing resistance when the rudders were not being used for maneuvering purposes.

The theory and hull form configurations described in this specification represent a major departure from the teachings and practice of the naval architecture art as practiced today. This invention features an improvement over prior art, either by improving individual elements of previous hull form configurations, or by skillfully and inventively combining the disparate design elements in an unusual displacement hull form configuration. The combinations described in the present embodiments have not been previously created, and the prior art references would not show the invention.

Even small resistance reductions are highly valued in the naval architecture art, so the prior art's lack of implementation of the various embodiment, which appreciably reduces resistance, demonstrates nonobviousness. This represents a previous failure of others: many designers have attempted to reduce displacement hull resistance below that of the prior art by changing stern shaping, yet none have achieved the additional resistance reduction achieved here through use of the various embodiments. The various embodiment contains something contrary to the prior art's teaching: the prior art emphasized reduction of wetted surface area for displacement hull design, and the minimization of inflection points in hull shaping.

Additionally, at least one of the presently envisioned embodiments is novel as it represents a new use of an old feature (using endplate-like devices to reduce transom stern displacement hull resistance). At least one of the embodiments represents a discovery of a critical area of a given prior art range.

Figure 5A:
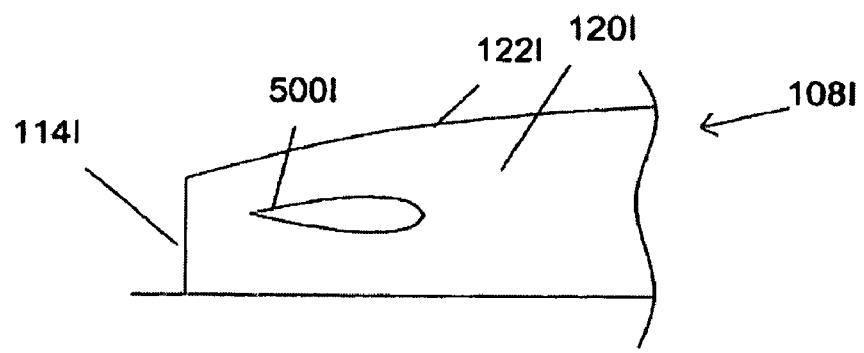
FIG. 5A is a highly diagrammatic, bottom plan view of a typical transom stern hull form and rudder, showing the right (starboard) side stern region viewed from below.

FIG. 5A is a highly diagrammatic, bottom plan view of a typical transom stern hull form and rudder, showing the right (starboard) side stern region viewed from below. Afterbody 108I includes transom stern hull underside 120I. Transom stern hull underside 120I is bounded by transom stern hull side 122I and lower transom edge 114I. Rudder 500I is attached to transom stern hull underside 120I.

Figure 5B:
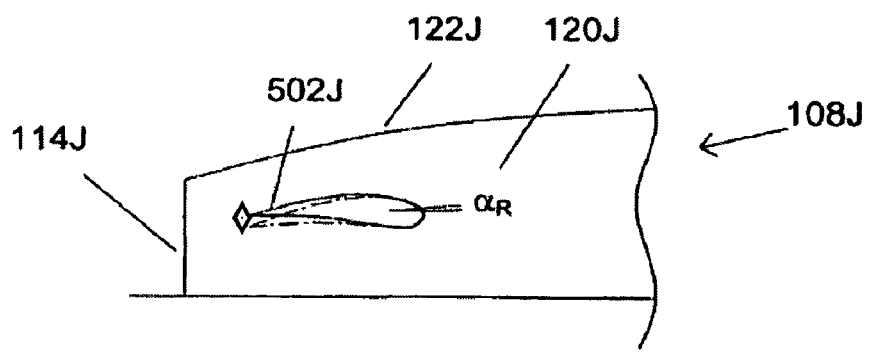
FIG. 5B is a view, similar to the view shown in FIG. 5A, wherein the hull form is provided with an cambered rudder.

One embodiment of the invention is shown in FIG. 5B. FIG. 5B is a view, similar to the view shown in FIG. 5A, wherein the hull form is provided with an inventive cambered rudder 502J. Rudder angle OCR is the angle between the vessel centerline and the rudder quarter chord line. In various embodiments, one or more rudders have a quarter chord line located a distance from the aft end of the hull, the distance being between 0 and approximately 25 percent of the hull waterline length.

Figure 6A:
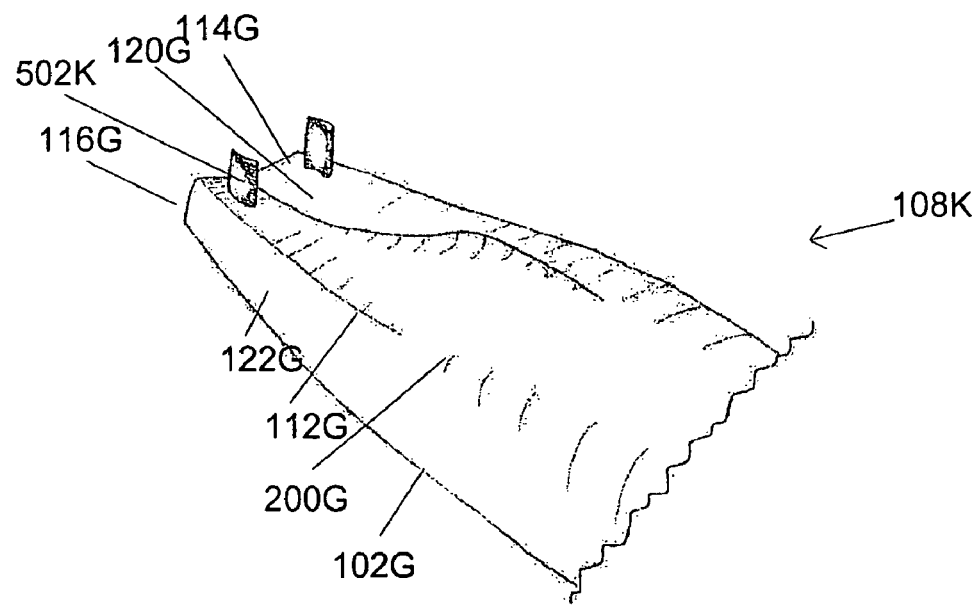
FIG. 6A is a perspective view of the stern construction according to some embodiments, showing the surface thereof below the waterline, when viewed from below the waterline, wherein the hull form is provided with cambered rudders.

FIG. 6A is a perspective view of the stern construction according to the invention, showing the surface thereof below the waterline, when viewed from below the waterline, wherein the hull form is provided with cambered rudders 502K. Cambered rudders 502K have pressure faces oriented inward, towards the vertical centerplane of afterbody 108K.

Figure 6B:
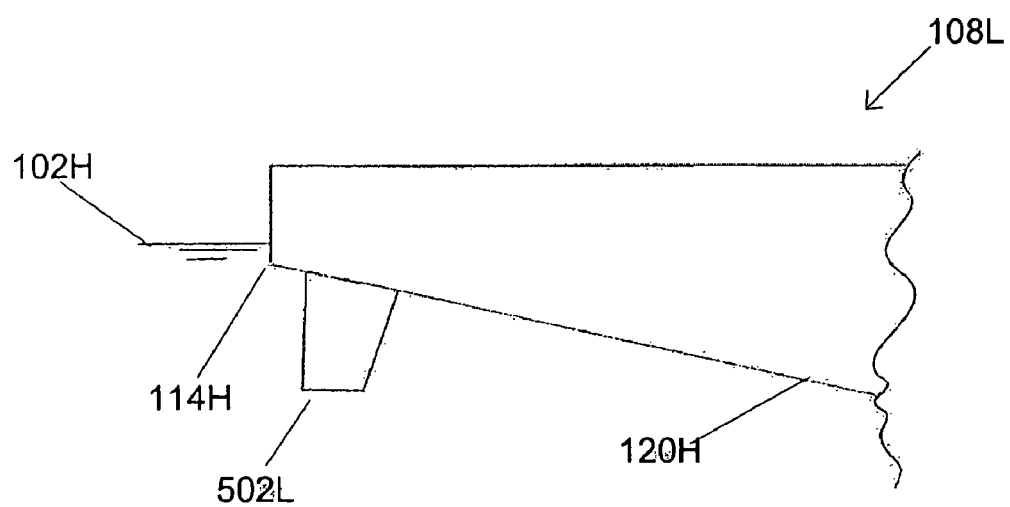
FIG. 6B is a highly diagrammatic, partial (stern), side elevation view of the stern construction according to some embodiments, wherein the hull form is provided with cambered rudders.

FIG. 6B is a highly diagrammatic, partial (stern), side elevation view of the stern construction according to the invention, wherein the hull form is provided with inventive cambered rudders 502L. Cambered rudders 502L have pressure faces oriented inward, towards the longitudinal vertical centerplane 110H (not shown) of the afterbody 108L.

In FIGS. 6A, 6B, water flowing along transom stern hull underside 120G passes cambered rudders 502K. Shaping of cambered rudders 502K alters the flow of water, producing a high pressure region between cambered rudders 502K. The presence of cambered rudders 502K also augments the pressure generation of transom stern hull underside 120G by endplate and winglet effects. The result is that the transom stern hull underside 120G flow has greater pressure recovery and lower trailing wake vorticity losses.

Figure 7A:
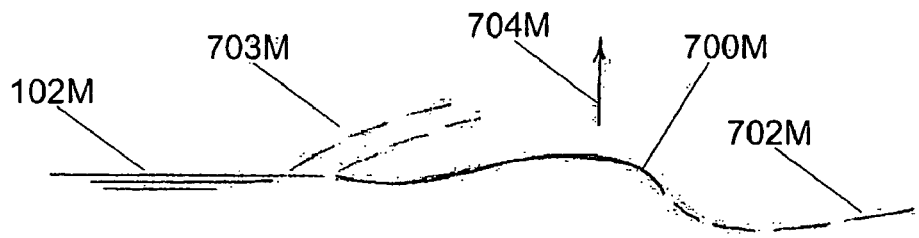
FIG. 7A is a highly diagrammatic side elevation view of a two-dimensional supercavitating hydrofoil moving from right to left along the water surface.

FIG. 7A is a highly diagrammatic side elevation view of a (prior art) supercavitating hydrofoil 700M moving from right to left along the static water surface 102M. The supercavitating hydrofoil 700M leaves a dynamic water surface 702M behind supercavitating hydrofoil 700M. In practical applications, some water may also rise ahead of the supercavitating hydrofoil 700M in the form of dynamic waterline spray 703M. Water flowing along the supercavitating hydrofoil 700M results in a lift vector 704M.

Figure 7B:
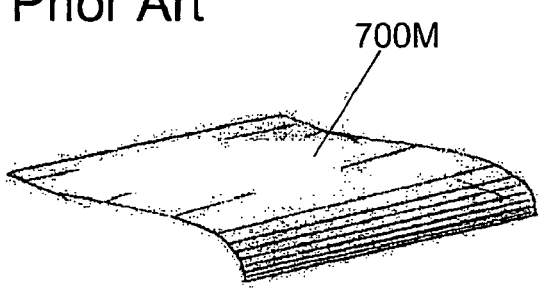
FIG. 7B shows a perspective view of a supercavitating hydrofoil surface.

FIG. 7B shows a perspective view of the (prior art) supercavitating hydrofoil surface 700M.

Figure 7C:
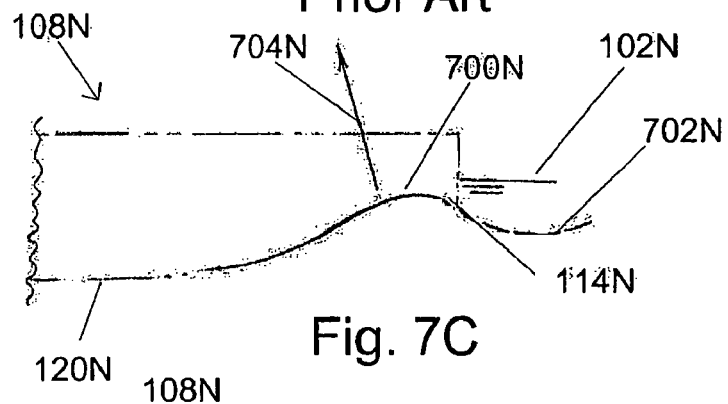
FIG. 7C is a view, similar to the view shown in FIG. 7A, showing a highly diagrammatic partial (stern), side elevation view of a transom stern hull, wherein the hull form is provided with an supercavitating hydrofoil shape aft.

FIG. 7C shows one embodiment of the invention. FIG. 7C is a view, similar to the view shown in FIG. 7A, showing a highly diagrammatic partial (stern), side elevation view of the transom stern hull afterbody 108N. The hull afterbody 108N is provided with the inventive supercavitating hydrofoil 700N shape aft. The afterbody 108N travels from right to left. Water passing along transom stern hull underside 120N, which incorporates the form of the supercavitating hydrofoil 700N along part of its length, results in a dynamic waterline 702N. The supercavitating hydrofoil 700N form produces a lift vector 704N.

Figure 7D:
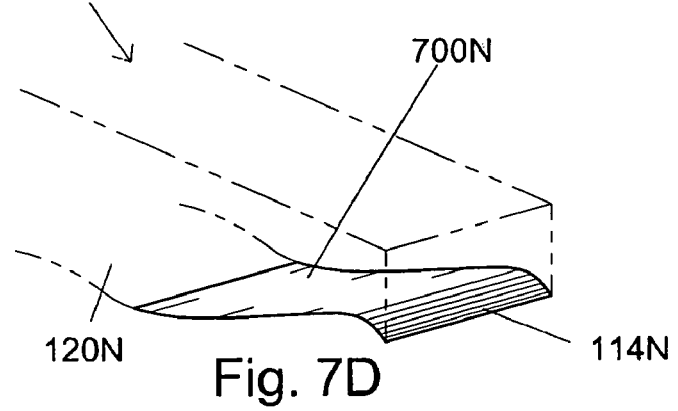
FIG. 7D is a view, similar to the view shown in FIG. 7B, showing a highly diagrammatic partial (stern), perspective view of a transom stern hull, wherein the hull form is provided with an supercavitating hydrofoil shape aft.

FIG. 7D is a view, similar to the view shown in FIG. 7B, showing a highly diagrammatic partial (stern), perspective view of a transom stern hull afterbody 108N, wherein the hull form is provided with an inventive supercavitating hydrofoil 700N shape aft along the after portion of the transom stern hull underside 120N, ending at or near the lower transom edge 114N.

Figure 8A:
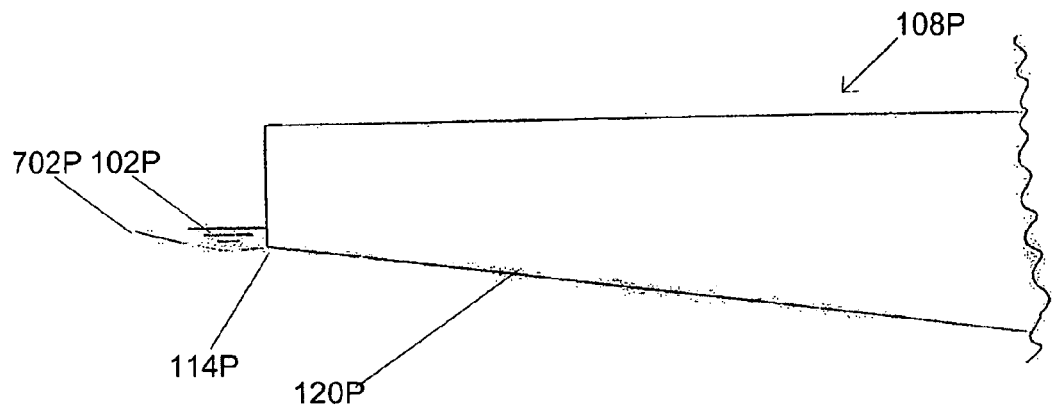
FIG. 8A is a highly diagrammatic, partial (stern), side elevation view of a typical hull form of a transom stern displacement vessel with straight run (also known as straight buttock lines).

FIG. 8A is a highly diagrammatic, partial (stern), side elevation view of a prior art hull form of a transom stern displacement vessel with straight run (also known as straight buttock lines). Afterbody 108P includes the substantially straight transom stern hull underside 120P, terminating in the lower transom edge 114P. Aftbody 108P is navigating a body of water with the static waterline 102P. Forward motion of aftbody 108P through the body of water produces dynamic waterline 702P.

Figure 8B:
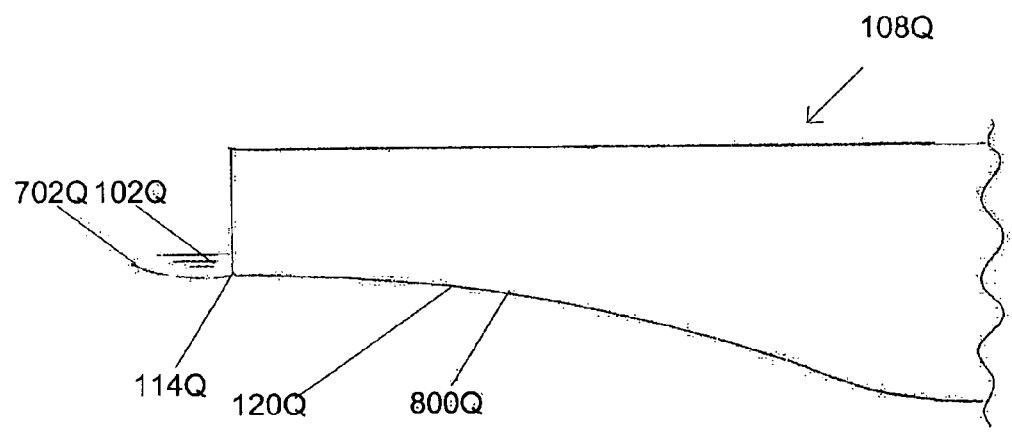
FIG. 8B is a view, similar to the view shown in FIG. 8A, wherein the hull form is provided with concave shaping (also known as hooked buttock lines).

FIG. 8B is a view, similar to the view shown in FIG. 10A, wherein a prior art hull form aftbody 108Q is provided with a type of shaping known as concave buttock lines 800Q (also known as hooked buttock lines) along a portion of the transom stern hull underside 120Q.

Figure 8C:
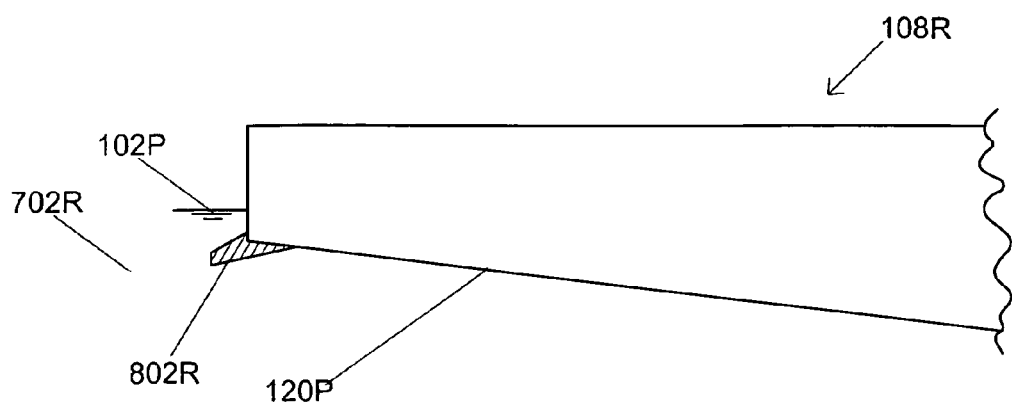
FIG. 8C is a view, similar to the view shown in FIG. 8A, wherein the hull form is provided with a combined wedge-flap.

FIG. 8C is a view, similar to the view shown in FIG. 8A, wherein a prior art hull form aftbody 108R is provided with a stern flap 802R (also known as wedge or combined wedge-flap).

Figure 8D:
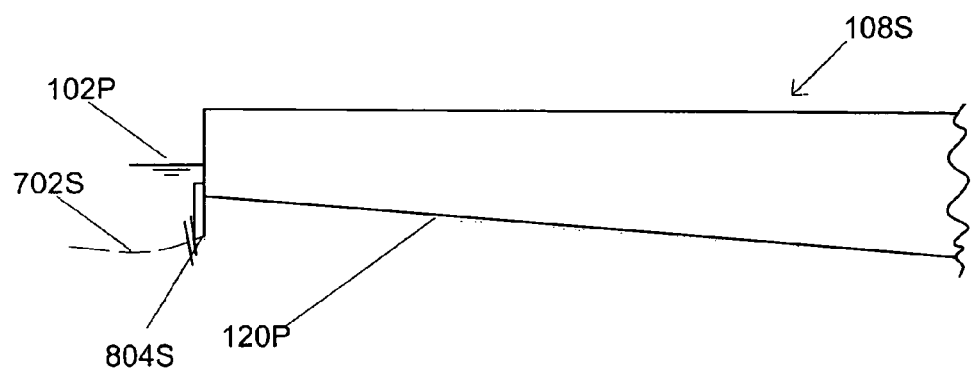
FIG. 8D is a view, similar to the view shown in FIG. 8A, wherein the hull form is provided with an interceptor plate.

FIG. 8D is a view, similar to the view shown in FIG. 8A, wherein a prior art hull form is provided with an interceptor plate 804S.

As shown in FIGS. 8B through 8D, prior art transom stern hull afterbodies 108D, 108Q, 108R, 108S previously included simple forms of camber shaping of the transom stern hull underside 120Q, or included structural additions to the transom stern hull underside 120P to produce simple camber shaping. Additions to create simple camber shaping of the transom stern underside 120P included stern flap 802R and interceptor plate 804S.

Figure 9A:
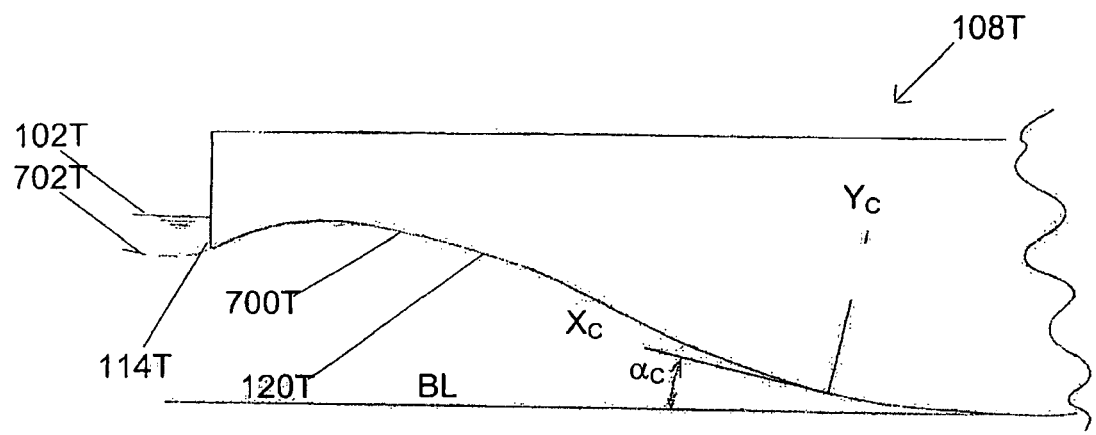
FIG. 9A is a view, similar to the view shown in FIG. 8A, wherein the hull form is provided with an supercavitating hydrofoil shape aft.

FIG. 9A is a view, similar to the view shown in FIG. 8A, wherein the hull form aftbody 108T is provided with an inventive supercavitating hydrofoil 700T shaping of the transom stern hull underside 120T (shaping of the aft buttock lines). The inventive supercavitating hydrofoil 700T shaping terminates near or at lower transom edge 114T. Supercavitating hydrofoil 700T shape is determined using a coordinate system defining supercavitating hydrofoil 700T chord ($X_C$) and camber ($Y_C$) along a coordinate system rotated at an angle (alpha-c) from a baseline of aftbody 108T, in order to allow supercavitating hydrofoil 700T to smoothly fair into transom stern hull underside 120T.

Figure 9B:
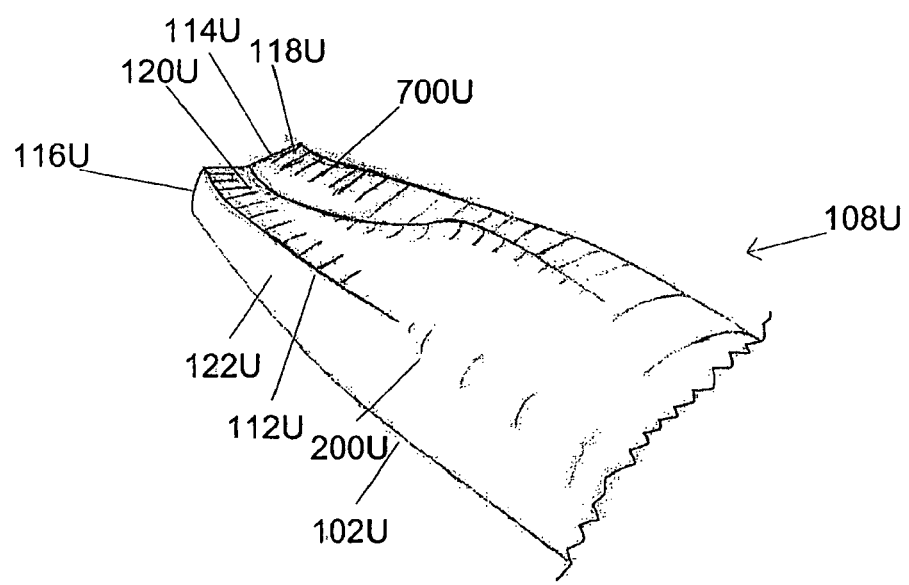
FIG. 9B is a perspective view of the stern construction according to some embodiments, showing the surface thereof below the waterline, when viewed from below the waterline, wherein the hull form is provided with an supercavitating hydrofoil shape aft.

FIG. 9B is a perspective view of the stern construction according to the invention, showing the surface thereof below the waterline 102U, when viewed from below the waterline, wherein the hull form aftbody 108U is provided with inventive supercavitating hydrofoil 700U shaping aft.

Figure 10:
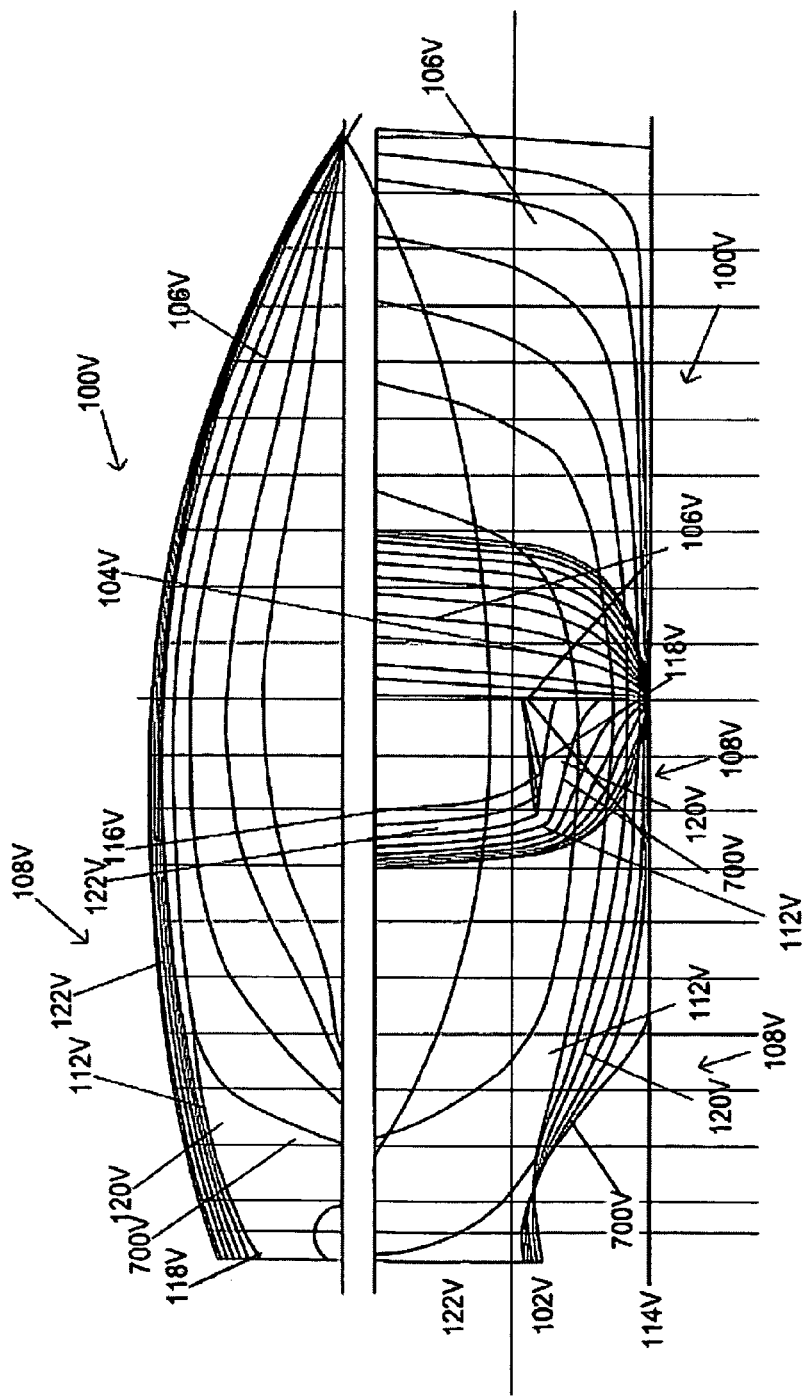
FIG. 10 shows the full hull form lines drawing of the stern construction according to some embodiments with supercavitating hydrofoil shape aft. The upper portion of the drawing is a longitudinal plan view (commonly referred to as a half-breadth plan). The lower center portion contains fore and aft profile views (commonly referred to as a body plan). The body plan view is of the fore and aft body plan or cross-sections at the various stations along the length of the hull form, where the right half sections depict stations forward of midships, and the left half sections depict stations aft of midships, on each side of the longitudinal vertical centerplane of the hull form. The lower portion of the drawing also contains the longitudinal elevation view of the hull form (commonly referred to as a profile or sheer plan).

FIG. 10 shows the full hull form lines drawing of the stern construction according to the invention with supercavitating hydrofoil shape aft.

The upper portion of the drawing is a longitudinal plan view (commonly referred to as a half-breadth plan).

The lower center portion contains fore and aft profile views (commonly referred to as a body plan). The body plan view is of the fore and aft body plan or cross-sections at the various stations along the length of the hull form, where the right half sections depict stations forward of midships, and the left half sections depict stations aft of midships, on each side of the longitudinal vertical centerplane of the hull form.

The lower portion of the drawing also contains the longitudinal elevation view of the hull form (commonly referred to as a profile or sheer plan).

Hull form 100V is navigating a sea or body of water having static waterline 102V.

On the body plan, station lines 104V shows transverse cross-sections at the various stations along the length of hull form 100V, where the right half sections depict stations along the forebody 106V (ahead of amidships), and the left half sections depict stations along the afterbody 108V (aft of amidships), on each side of the longitudinal vertical centerplane 110V of hull form 100V. A distinctive knuckle line, or chine 112V develops towards the aft end of afterbody 108V. Lower transom edge 114V is substantially horizontal, and meets side transom edge 116V and chine 112V in a lower transom corner 118V. The substantially horizontal portion of hull form 100V surface, immediately forward of lower transom edge 114V, is the transom stern hull underside 120V. The substantially vertical portion of hull form 100V surface, immediately forward of side transom edge 116V, is the transom stern hull side 122V.

Transom stern hull underside 120V, includes supercavitating hydrofoil 700V shaping. The manner of using the hull form with the inventive supercavitating hydrofoil camber of FIGS. 7C and 7D is identical to that for (prior art) transom stern hull forms in present use, with the notable exception that the inventive supercavitating hydrofoil camber results in greater resistance and powering reduction than does the (prior art) transom stern hull form of FIG. 1, or FIGS. 8A-8D, alone.

FIG. 7A shows a prior art supercavitating hydrofoil 700M moving from right to left along static waterline 102M. Most water passes along the underside of supercavitating hydrofoil 700M and leaves a dynamic waterline 702M behind supercavitating hydrofoil 700M. In practical some applications, some water may also rise ahead of the supercavitating hydrofoil 700M in the form of dynamic waterline spray 703M. The shaping of the supercavitating hydrofoil 700 includes fore-aft curvature, which changes the path of fluid flow and reduces the velocity of the water. The reduction in water velocity towards the aft region of supercavitating hydrofoil 700M results in higher pressure according to Bernoulli's equation. The higher pressure generated under the supercavitating hydrofoil 700M generates a lift vector 704M on the supercavitating hydrofoil 700M. FIG. 7B shows a perspective view of the (prior art) supercavitating hydrofoil 700M.

FIGS. 7C and 7D depict a transom stern hull afterbody 108N, wherein the hull form is provided with an inventive supercavitating hydrofoil 700N shape aft along the after portion of the transom stern hull underside 120N. The action of the inventive supercavitating hydrofoil 700N shape is as follows. In FIG. 7C, the hull afterbody 108N is moving forward through the body of water with static waterline 102N. As the water passes along the afterbody 108N, some water flows along the transom stern hull underside 120N.

Farther aft, towards the lower transom edge 114N, the velocity of water flowing along the transom stern hull underside 120N is reduced. The shaping of the transom stern hull underside 120N typically includes fore-aft curvature, which changes the path of fluid flow and reduces the velocity of the water. The reduction in water velocity towards the lower transom edge 114N results in higher pressure according to Bernoulli's equation. The higher pressure generated under the transom stern hull underside 120N generates a lift vector 704N. Lift vector 704N includes a forward thrust component on the transom stern hull underside 120, resulting in reduced hull resistance. Lift vector 704N also includes a vertical thrust component on the transom stern hull underside 120N, that also reduces vessel resistance by reducing displacement.

FIG. 7D shows a perspective view similar to view 7C. FIG. 7D is a highly diagrammatic view that is much simpler in form than most transom stern hull forms, for reasons of clarity. One can imagine various alternative embodiments, by combining the inventive features of FIGS. 7C and 7D with prior art transom stern shaping shown in FIG. 1.

One goal of transom stern design is to reduce hull resistance by maximizing the high pressure generation (also known as "pressure recovery") under the transom stern hull underside 120P of FIG. 8A. FIG. 8A shows that some prior art hulls had little shaping of the transom stern hull underside 120P, and therefore had little pressure generation aft.

As shown in FIG. 8B, concave buttock lines 800Q are found on some prior art transom stern hulls, and can increase the beneficial pressure generation on the transom stern hull underside 120Q. Stern flap 802R shown in FIG. 8C, and interceptor plate 804S shown in FIG. 8D, effectively provide shaping of prior art transom stern hull underside 120P by changing the flow along the transom stern hull underside 120P.

In FIG. 7C, inventive supercavitating hydrofoil 700N applied to the transom stern hull underside 120N, augments the beneficial pressure generation effect of (prior art) transom stern hull underside 120N. Maximizing pressure generation is desirable for hull resistance reduction purposes. Inventive supercavitating hydrofoil 700N has a higher lift-to-drag ratio than (prior art) transom stern hull underside 120N cambering geometry, and is therefore superior to (prior art) transom stern hull underside 120N cambering geometry.

Inventive supercavitating hydrofoil 700N provides pressure generation benefits even when the supercavitating hydrofoil 700N operates below the static waterline 102N (operation at static waterline 102N is not required for beneficial effects to occur.)

The operation of the inventive supercavitating hydrofoil shown in FIGS. 9A, 9B, 10, is similar to the operation described in FIG. 7C. Preferably there is a specifically-shaped cambered surface (supercavitating hydrofoil 700T) integrated into the transom stern hull underside 120T, characterized by a 3-term Johnson camber shape with a two-dimensional section design lift coefficient of between approximately 0.01 and 0.12. Other supercavitating hydrofoil camber shapes of high lift-to-drag ratios can conceivably be substituted, such as a Johnson 5-term section, for example. See Johnson, Virgil E., "Theoretical and Experimental Investigation of Supercavitating Hydrofoils Operating Near the Free Water Surface," NASA TR R-93, 1961.

Figure 11A:
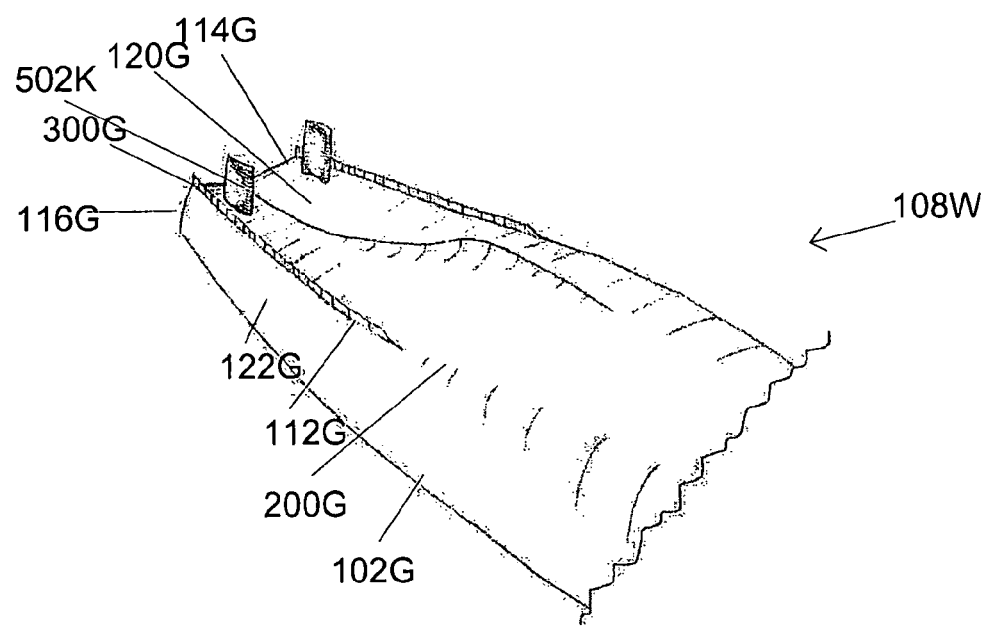
FIG. 11A is a perspective view of the stern construction according to some embodiments, showing the surface thereof below the waterline, when viewed from below the waterline, wherein the hull form is provided with chine endplates, and with cambered rudders.

Referring to FIG. 9A, a perfectly horizontal span orientation supercavitating hydrofoil 700T is not required for achieving the desired operation, as a transversely angled supercavitating hydrofoil 700T could provide a similar operative result. Angling supercavitating hydrofoil 700T transversely would, however, modify the lift-to-drag characteristics in operation. A developable surface form for supercavitating hydrofoil 700T is not required for achieving the desired operation. Twisting, curving, or otherwise modifying the form of supercavitating hydrofoil 700T from a flat shape, would, however, modify the lift-to-drag characteristics in operation. FIG. 11A is a view, similar to the view shown in FIG. 4A, wherein the hull form aftbody 108W is provided with a pair of inventive endplates 300G and a pair of inventive cambered rudders 502K.

Figure 11B:
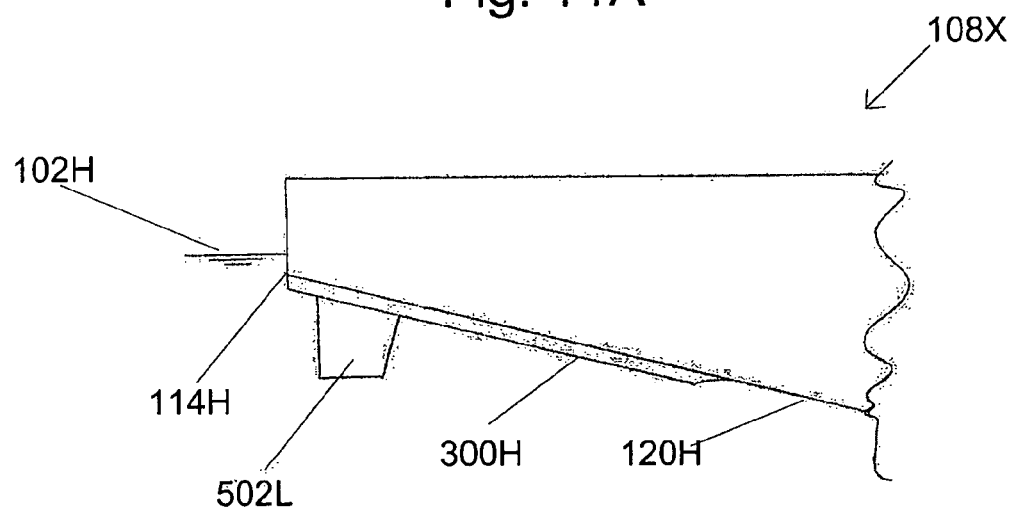
FIG. 11B is a highly diagrammatic, partial (stern), side elevation view of a hull form, wherein the hull form is provided with chine endplates, and cambered rudders.

FIG. 11B is a view, similar to the view shown in FIG. 4B, wherein the hull form aftbody 108X is provided with a pair of inventive endplates 300H and a pair of inventive cambered rudders 502H.

Figure 12A:
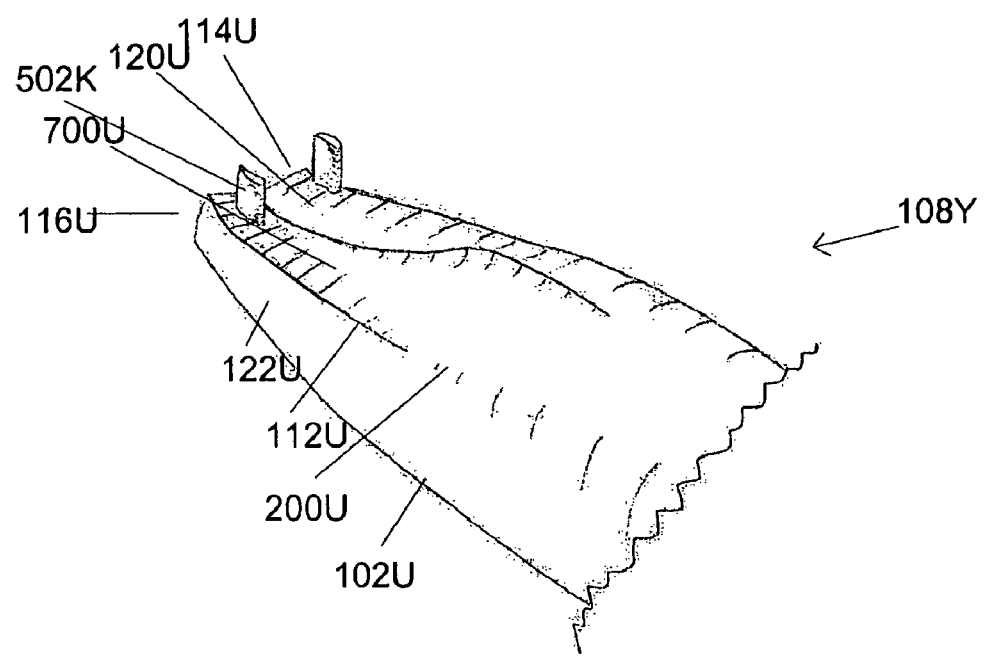
FIG. 12A is a highly diagrammatic partial (stern), perspective view of the stern construction according to some embodiments, showing the surface thereof below the waterline, when viewed from below the waterline, wherein the hull form is provided with an supercavitating hydrofoil shape aft, and with cambered rudders.

FIG. 12A is a view, similar to the view shown in FIG. 6A, wherein the hull form aftbody 108Y is provided with a pair of inventive cambered rudders 502K, as well as the inventive supercavitating hydrofoil 700U shape along the transom stern hull underside 120U.

Figure 12B:
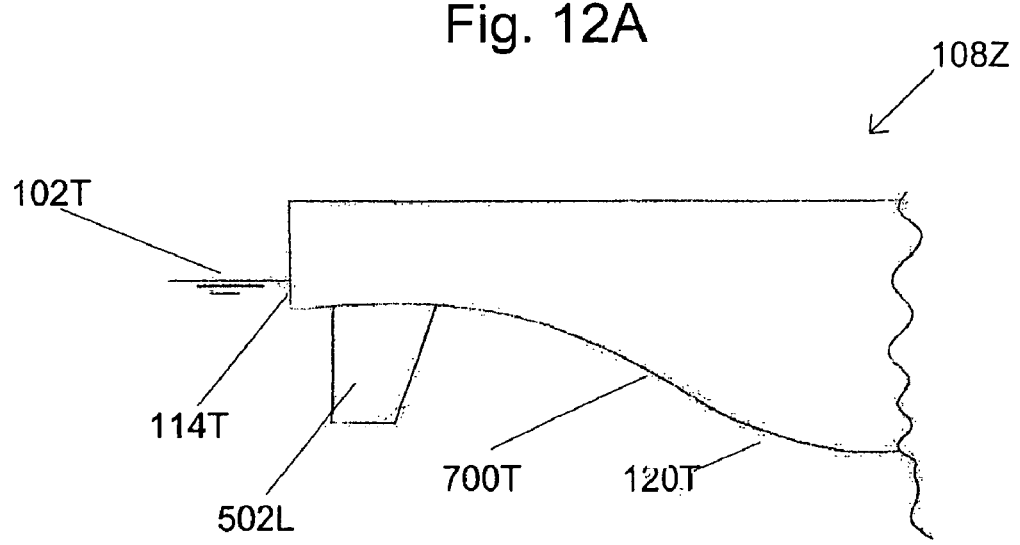
FIG. 12B is a highly diagrammatic, partial (stern), side elevation view of a hull form, wherein the hull form is provided with an supercavitating hydrofoil shape aft, and with cambered rudders.
Figure 13A:
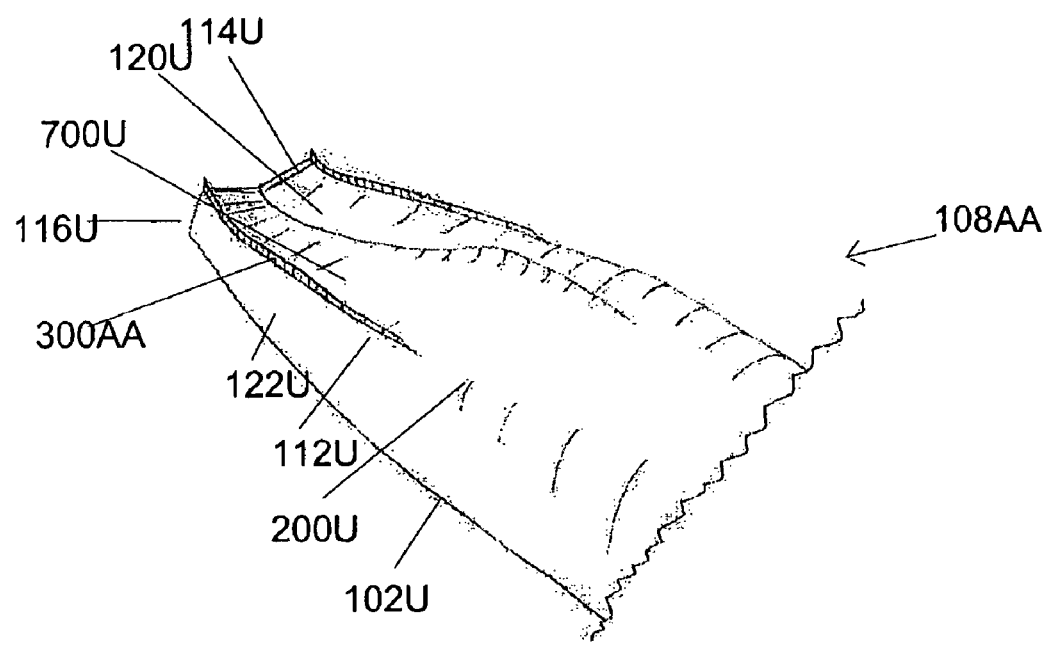
FIG. 13A shows a perspective view of the stern construction according to some embodiments, showing the surface thereof below the waterline, when viewed from below the waterline, wherein the hull form is provided with supercavitating hydrofoil buttock line shaping aft, and with chine endplates aft.

FIG. 12B is a view, similar to the view shown in FIG. 6B, wherein the hull form aftbody 108Z is provided with a pair of inventive cambered rudders 502L, as well as the inventive supercavitating hydrofoil 700T shape along the transom stern hull underside 120T. FIG. 13A is a view, similar to the view shown in FIG. 4A, wherein the hull form aftbody 108AA is provided with a pair of inventive endplates 300AA, as well as the inventive supercavitating hydrofoil 700U shape along the transom stern hull underside 120U.

Figure 13B:
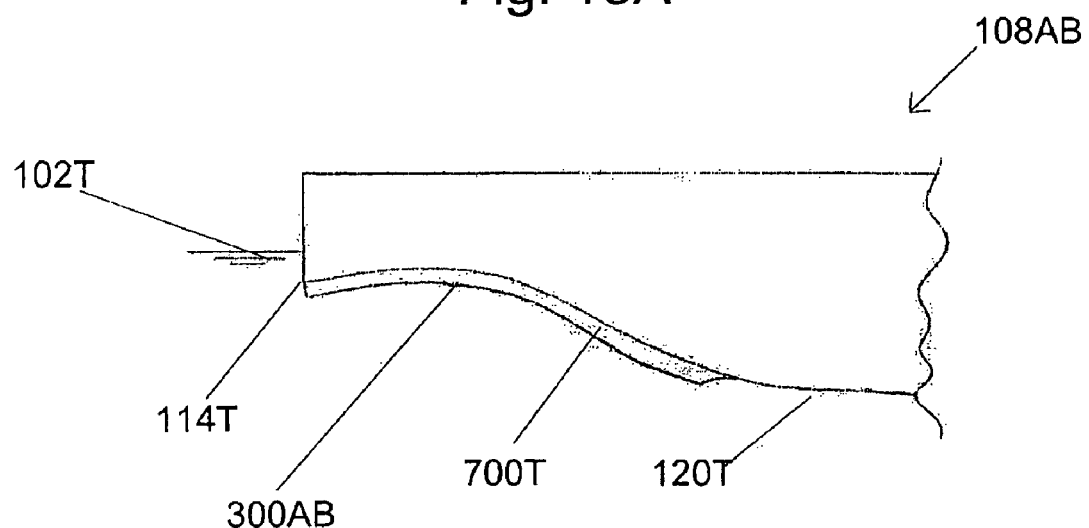
FIG. 13B is a highly diagrammatic, partial (stern), side elevation view of a hull form, wherein the hull form is provided with an supercavitating hydrofoil shape aft, and with cambered chine endplates aft.

FIG. 13B is a view, similar to the view shown in FIG. 4B, wherein the hull form aftbody 108AB is provided with a pair of inventive endplates 300AB, as well as the inventive supercavitating hydrofoil 700T shape along the transom stern hull underside 120T.

Figure 14A:
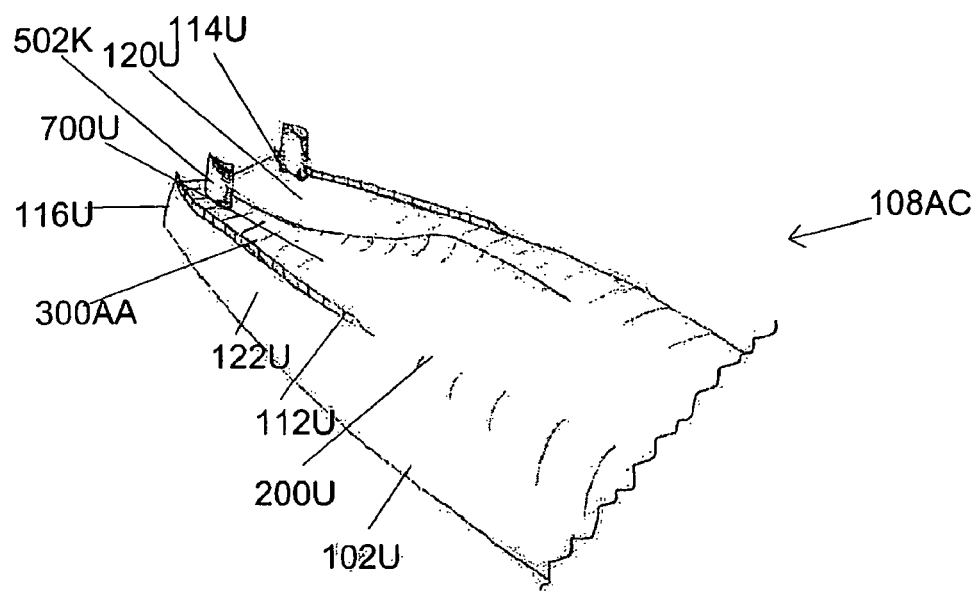
FIG. 14A is a view, similar to the view shown in FIG. 4A, wherein the hull form is provided with a pair of endplates, in addition to a pair of cambered rudders, as well as the supercavitating hydrofoil shape aft.

FIG. 14A is a view, similar to the view shown in FIG. 4A, wherein the hull form aftbody 108AC is provided with a pair of inventive endplates 300AA, in addition to a pair of inventive cambered rudders 502K, as well as the inventive supercavitating hydrofoil 700U shape along the transom stern hull underside 120U.

Figure 14B:
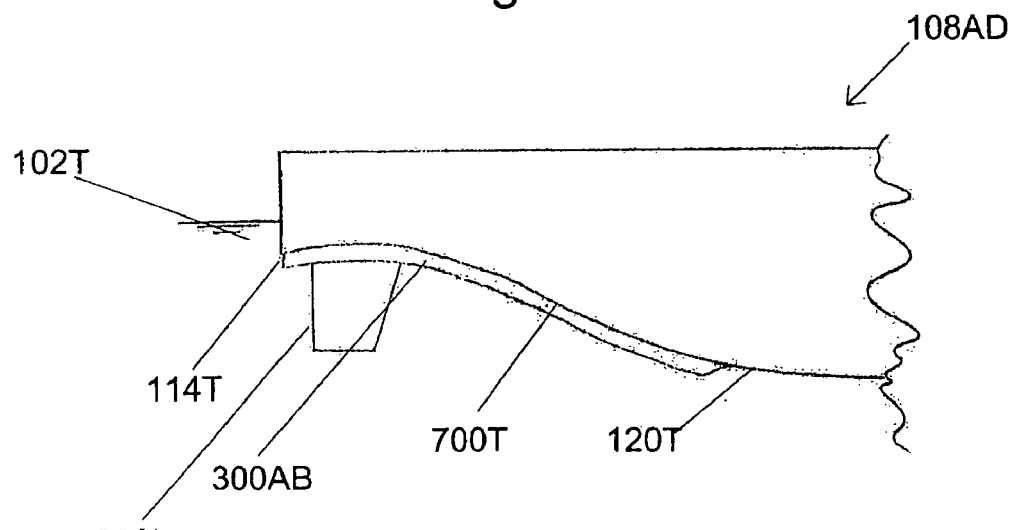
FIG. 14B is a view, similar to the view shown in FIG. 4B, wherein the hull form is provided with a pair of endplates, in addition to a pair of cambered rudders, as well as the supercavitating hydrofoil shape aft.

FIG. 14B is a view, similar to the view shown in FIG. 4B, wherein the hull form aftbody 108AD is provided with a pair of inventive endplates 300AB, in addition to a pair of inventive cambered rudders 502L, as well as the inventive supercavitating hydrofoil 700T shape along the transom stern hull underside 120T.

Figure 14C:
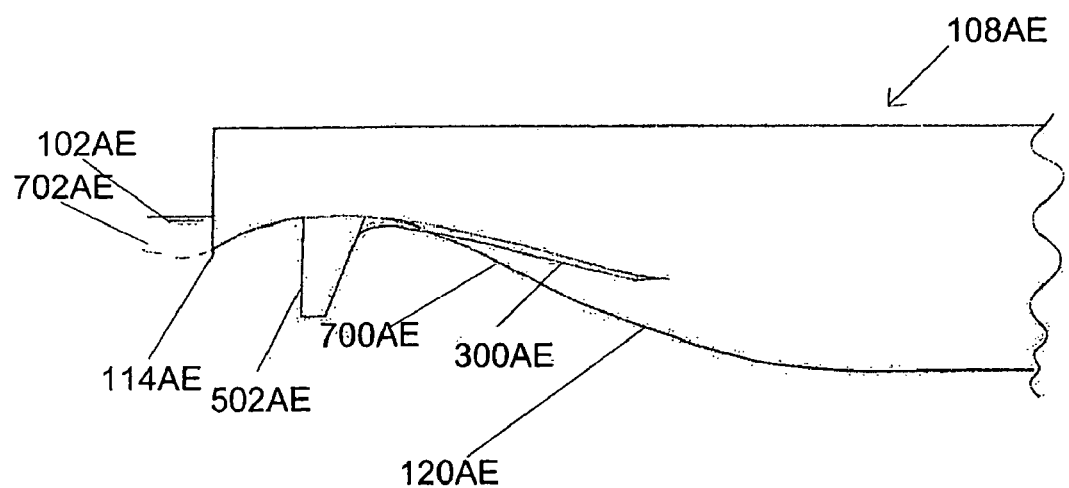
FIG. 14C is a view, similar to the view shown in FIG. 14B, wherein the hull form aftbody is provided with a pair of endplates, in addition to a pair of cambered rudders, as well as the supercavitating hydrofoil shape aft. The cambered rudders are integral with the endplates, and the endplates end at the cambered rudders, to demonstrate one of many potential variations upon the basic embodiment.

FIG. 14C is a view, similar to the view shown in FIG. 14B, wherein the hull form aftbody 108AE is provided with a pair of inventive endplates 300AE, in addition to a pair of inventive cambered rudders 502AE, as well as the inventive supercavitating hydrofoil 700AE shape along the transom stern hull underside 120AE. The cambered rudders are integral with the endplates, and the endplates end at the cambered rudders, to demonstrate one of many potential variations upon the basic embodiment that are possible.

ADVANTAGES

From the description provided above, a number of advantages of some embodiments of my transom stern hull form and appendages become evident:

(a) At least one embodiment of the invention provides a lower resistance, transom stern displacement hull form and appendage configuration, for vessels moving through the water over a wide range of operating speeds.

(b) Lower resistance means that propulsive power requirements and fuel consumption will be reduced.

(c) Lower resistance means that at least one embodiment of the invention operates with reduced ship wave train, with all the ancillary benefits this entails such as reduced shoreline erosion, and reduced danger to other small vessels.

(d) At least one embodiment of the invention operates with reduced trim and draft aft.

Accordingly, the reader will see that at least one embodiment of the invention provides a lower resistance, transom stern displacement hull form and appendage configuration, for vessels moving through the water over a wide range of operating speeds. In addition, lower resistance means that propulsive power requirements and fuel consumption will be reduced. Furthermore, at least one embodiment has the additional advantages in that it operates with reduced trim and draft aft;

it operates with reduced ship wave train, with all the ancillary benefits this entails such as reduced navigable draft requirement, reduced shoreline erosion, and reduced danger to other small vessels.

While the description above contains many specificities, these should not be construed as limitations on the scope of the invention, but rather as an exemplification of several presently preferred embodiments thereof. Many other ramifications and variations are possible within the teachings of the various embodiments. For example, the endplates can have other cross-sectional shapes, such as trapezoidal, curved, etc.; the endplates can have other longitudinal profiles, such as tapering in height along length of the hull underside; the supercavitating hydrofoil hull underside can have other longitudinal profiles, such as supercavitating hydrofoil sections of higher or lower order than the Johnson 3-term and Johnson 5-term sections; the rudders or fins can have other placement, such as at a moderate angle with respect to normal to the hull underside; the hull underside can have other transverse shaping, such as anhedral (negative deadrise angle) to increase pressure recovery effects; the hull aftbody design waterplane can have other terminal shaping, such as elliptical, or a tapered transom stern shape achieved by progressively swept transverse sections along the hull aftbody, to reduce trailing wake vorticity.

Thus the scope of the invention should be determined by the appended claims and their legal equivalents, rather than by the examples given. The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. An apparatus, comprising:
    a transom stern displacement hull configured to operate at a speed-to-length ratio of from about 0.80 to about 3.00, the hull bisected along its length by a vertical centerplane, the hull including a hull underside along an aft portion of the hull, the hull underside having a deadrise angle along the hull underside of from approximately −12 degrees to 10 degrees, with the hull underside bounded on a right lateral side of the hull by a right hull side and on a left lateral side of the hull by a left hull side, the right and left hull sides each extending from the hull underside to a waterline;
    a right endplate coupled to the hull proximal the right hull side; and
    a left endplate coupled to the hull proximal the left hull side and generally opposite the right endplate, the right and left endplates each having a fixed height from approximately 0.2 percent of a displacement hull form beam measured adjacent the waterline to approximately 10 percent of the displacement hull beam measured adjacent the waterline,
    wherein the right and left endplates extend along a hull length from approximately the aft end of the hull toward a bow of the hull from about 1 to about 40 percent of hull waterline length, with the right and left endplates each generally aligned within approximately 20 degrees of being parallel to the vertical centerplane of the hull.

2. The apparatus of claim 1, further comprising a pair of rudders having a span orientation that is substantially perpendicular to a plane defined by the waterline, the pair of rudders coupled to the hull underside on opposite sides of the longitudinal center plane.

3. The apparatus of claim 2, wherein the rudders are moveable.

4. The apparatus of claim 2, wherein the span orientation of each of the pair of rudders is approximately parallel.

5. The apparatus of claim 2, wherein each of the pair of rudders has a quarter chord line located less than approximately 25 percent of the waterline length of the hull from the aft end of the hull.

6. The apparatus of claim 2, wherein a right rudder is disposed proximal the right hull side, and a left rudder is disposed proximal the left hull side.

7. The apparatus of claim 2, wherein a right rudder of the pair has a right rudder cross section profile when sectioned along a plane that is substantially parallel to a plane defined by the waterline, and a left rudder of the pair has a left rudder cross section profile that substantially mirrors the right rudder cross section profile,
wherein the left and right cross section profiles each includes a streamlined cambered hydrofoil such that a respective high pressure side of each rudder faces the vertical centerplane of said hull form, said camber having a lift coefficient of between 0.01 and 1.0.

8. An apparatus, comprising:
a transom stern displacement hull configured to operate at a speed-to-length ratio of from about 0.80 to about 3.00, the hull including a hull underside along an aft portion of the hull, the hull underside having a deadrise angle along the hull underside of from approximately −12 degrees to 10 degrees, with the hull underside bounded on a right lateral side of the hull by a right hull side and on a left lateral side of the hull by a left hull side, the right and left hull sides each extending from the hull underside to a waterline; and
a pair of rudders coupled to the hull underside on opposite sides of a vertical centerplane that bisects the hull along its length, the rudders each having a span orientation that is substantially perpendicular to the underside, the rudders each having a chord orientation that is substantially parallel to the vertical centerplane of the hull, the rudders each having a cross-sectional shape along a plane substantially parallel to the plane defined by the waterline, the cross-sectional shape defining a streamlined cambered hydrofoil, with respective high pressure sides of the rudders each facing the vertical plane, the rudders constructed and arranged to produce lift coefficients of between 0.01 and 1.0, with each of the rudders having a respective rudder quarter chord line located a distance from the aft end of the hull, the distance being between 0 and approximately 25 percent of the hull waterline length.

9. The apparatus of claim 8, wherein the rudders are moveable.

10. The apparatus of claim 8, wherein the hull defines a right and left chine, with the right rudder disposed along the underside proximal the right chine, and the left rudder disposed along the underside proximal the left chine.

11. The apparatus of claim 8, wherein the hull underside includes a cambered surface defined by a supercavitating hydrofoil shape, and wherein the cambered surface has a longitudinal extent along the hull underside, the extent extending from the aft portion of the hull underside toward a bow from about 10 percent to about 50 percent of the waterline length of the hull, the cambered surface having a transverse extent spanning the underside, wherein the cambered surface has a two-dimensional section design lift coefficient between 0.01 and 0.12.

12. The apparatus of claim 8, wherein the rudders are configured to be moveable independently in a first mode and in alignment in a second mode.

13. The apparatus of claim 12, wherein alignment of the rudders with respect to each other is adjustable based on at least one of: varying displacement hull speed, resistance reduction and rudder cavitation.

14. The apparatus of claim 11, wherein the supercavitating hydrofoil shape comprises one of the group consisting of a Johnson 3-term shape and a Johnson 5-term shape.

15. An apparatus, comprising:
a transom stern displacement hull configured to operate at a speed-to-length ratio of from about 0.80 to about 3.00, the hull including a hull underside along an aft portion of the hull, the hull underside having a deadrise angle along the hull underside of from approximately −12 degrees to 10 degrees, with the hull underside bounded on a right lateral side of the hull by a right hull side and on a left lateral side of the hull by a left hull side, the right and left hull sides each extending from the hull underside to a waterline,
wherein the hull underside includes a cambered surface defined by a supercavitating hydrofoil shape, the cambered surface having a two-dimensional section design lift coefficient of between 0.01 and 0.12, with a longitudinal extent spanning from the aft portion of the hull toward a bow from about 10 to about 50 percent of the waterline length of the hull, said cambered surface having a transverse extent spanning the underside, and
wherein the supercavitating hydrofoil shape comprises one of the group consisting of a Johnson 3-term shape and a Johnson 5-term shape.

16. The apparatus of claim 15, wherein the hull underside deadrise angle is zero or negative.

17. An apparatus, comprising:
a transom stern displacement hull configured to operate at a speed-to-length ratio of from about 0.80 to about 3.00, the hull including a hull underside along an aft portion of the hull, the hull underside having a deadrise angle along the hull underside of from approximately −12 degrees to 10 degrees, with the hull underside bounded on a right lateral side of the hull by a right hull side and on a left lateral side of the hull by a left hull side, the right and left hull sides each extending from the hull underside to a waterline;
a right endplate coupled proximal the right hull side; and
a left endplate coupled proximal the right hull side and generally opposite the right endplate,
wherein the endplates each have a fixed height of about 0.2 to about 10 percent of a displacement hull beam measured adjacent a waterline, and
wherein the hull underside includes a cambered surface defined by a supercavitating hydrofoil shape, the cambered surface having a two-dimensional section design lift coefficient of between 0.01 and 0.12, with a longitudinal extent spanning from the aft portion of the hull toward a bow from about 10 to about 50 percent of the waterline length of the hull, said cambered surface having a transverse extent spanning the underside.

18. An apparatus, comprising:
a transom stern displacement hull configured to operate at a speed-to-length ratio of from about 0.80 to about 3.00, the hull including a hull underside along an aft portion of the hull, the hull underside having a deadrise angle along the hull underside of from approximately −12 degrees to 10 degrees, with the hull underside bounded on a right lateral side of the hull by a right hull side and on a left lateral side of the hull by a left hull side, the right and left hull sides each extending from the hull underside to a waterline;
a right endplate coupled proximal the right hull side and extending generally along a length of the hull; and
a left endplate coupled proximal the right hull side and generally opposite the right endplate and extending generally along the length of the hull,
wherein the right and left endplates extend along a hull length from the aft portion and toward a bow from about 1 to about 40 percent the waterline length of the hull, with the right and left endplates each generally aligned within approximately 20 degrees of being parallel to a vertical centerplane of the hull, and
wherein the hull underside includes a cambered surface defined by a supercavitating hydrofoil shape, the cambered surface having a two-dimensional section design lift coefficient of between 0.01 and 0.12, with a longitudinal extent spanning from the aft portion of the hull toward a bow from about 10 to about 50 percent of the waterline length of the hull, said cambered surface having a transverse extent spanning the underside.

19. The apparatus of claim 18, wherein the right and left endplates are generally perpendicular to a plane defined by the waterline, and wherein the right and left endplates each extend along respective outboard portions of the hull underside, the right and left endplates being proximal respective right and left hull sides.

20. An apparatus, comprising:
a transom stern displacement hull configured to operate at a speed-to-length ratio of from about 0.80 to about 3.00, the hull including a hull underside along an aft portion of the hull, the hull underside having a deadrise angle along the hull underside of from approximately −12 degrees to 10 degrees, with the hull underside bounded on a right lateral side of the hull by a right hull side and on a left lateral side of the hull by a left hull side, the right and left hull sides each extending from the hull underside to a waterline; and
a pair of rudders coupled to the hull underside on opposite sides of a vertical centerplane that bisects the hull along its length, the rudders each having a span orientation that is substantially perpendicular to the underside, the rudders each having a chord orientation that is substantially parallel to the longitudinal centerplane of the hull, the rudders each having a cross-sectional shape along a plane substantially parallel to the plane defined by the waterline, the cross-sectional shape defining a streamlined cambered hydrofoil, with respective high pressure sides of the rudders each facing the longitudinal vertical centerplane, the rudders constructed and arranged to produce lift coefficients of between 0.01 and 1.0, the pair of rudders oriented substantially perpendicular to a plane defined by the waterline, the pair of rudders disposed along the underside joined at a substantially vertical orientation to said hull underside, the rudders having a quarter chord line located less than approximately 25 percent of the waterline length of the hull from the aft end of the hull, with a right rudder disposed proximal the right hull side and with a left rudder disposed proximal the left hull side,
wherein the hull defines a right and left chine, with the right rudder disposed along the underside proximal the right chine, and the left rudder disposed along the underside proximal the left chine, and
wherein the hull underside includes a cambered surface defined by a supercavitating hydrofoil shape, the cambered surface having a two-dimensional section design lift coefficient of between 0.01 and 0.12, with a longitudinal extent spanning from the aft portion of the hull toward a bow from about 10 to about 50 percent of the waterline length of the hull, said cambered surface having a transverse extent spanning the underside.

21. The apparatus of claim 20, wherein the rudders are moveable.

* * * * *